(12) United States Patent
Ueno

(10) Patent No.: US 7,397,921 B2
(45) Date of Patent: Jul. 8, 2008

(54) RECEIVING APPARATUS

(75) Inventor: Takafumi Ueno, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 761 days.

(21) Appl. No.: 10/619,524

(22) Filed: Jul. 16, 2003

(65) Prior Publication Data
US 2004/0059911 A1 Mar. 25, 2004

(30) Foreign Application Priority Data
Jul. 19, 2002 (JP) ............................. 2002-210727

(51) Int. Cl.
*H04N 7/167* (2006.01)
(52) U.S. Cl. .................. 380/241; 380/240; 713/150; 713/165; 713/168; 713/193
(58) Field of Classification Search ................ 713/165, 713/150, 168, 193; 705/51; 380/240–241; 370/542
See application file for complete search history.

(56) References Cited

U.S. PATENT DOCUMENTS

| | | | | |
|---|---|---|---|---|
| 5,237,611 A | * | 8/1993 | Rasmussen et al. | 380/284 |
| 5,878,135 A | * | 3/1999 | Blatter et al. | 380/239 |
| 6,021,199 A | * | 2/2000 | Ishibashi | 380/217 |
| 6,038,319 A | | 3/2000 | Chari | |
| 6,256,513 B1 | | 7/2001 | Minamida | |
| 6,473,858 B1 | * | 10/2002 | Shimomura et al. | 713/150 |
| 6,999,947 B2 | * | 2/2006 | Utsumi et al. | 705/59 |
| 7,023,992 B1 | * | 4/2006 | Kubota et al. | 380/210 |
| 7,035,363 B1 | * | 4/2006 | Ikeda | 375/356 |
| 7,075,994 B2 | * | 7/2006 | Ihara | 375/240.28 |
| 2001/0023484 A1 | * | 9/2001 | Ichimura | 713/193 |
| 2002/0034300 A1 | * | 3/2002 | Thuvesholmen et al. | 380/256 |
| 2002/0051545 A1 | | 5/2002 | Ogilvie | |
| 2002/0116612 A1 | * | 8/2002 | Yamamichi et al. | 713/168 |
| 2002/0176578 A1 | | 11/2002 | Lapat et al. | |
| 2003/0005279 A1 | * | 1/2003 | Valenci et al. | 713/150 |
| 2004/0250273 A1 | * | 12/2004 | Swix et al. | 725/25 |

FOREIGN PATENT DOCUMENTS

| | | |
|---|---|---|
| WO | 01/91052 | 11/2001 |
| WO | 03/039155 | 5/2003 |

OTHER PUBLICATIONS

XP002230687 DVB Call for Proposals for CPCM Technologies, Jul. 2001.
International Organisation for Standardisation, ISO/IEC JTC1/SC 29/WG 11 (ISO/IEC 13818-1:2000 PDAMZ), Mar. 2002, pp. I-VI, 1-53.

(Continued)

*Primary Examiner*—Kimyen Vu
*Assistant Examiner*—Baotran N To
(74) *Attorney, Agent, or Firm*—Greenblum & Bernstein, P.L.C.

(57) ABSTRACT

A transmission apparatus updates the encryption method in the event the encryption method is broken. The tool ID of a decryption tool for encrypted data is acquired, the presence of the tool is confirmed and the tool is then acquired and updated, and encrypted data is processed and transmitted based on rights information associated with the encrypted data.

12 Claims, 15 Drawing Sheets

OTHER PUBLICATIONS

"Intellectual Property Management and Protection in MPEG Standards," ISO/IEC JTC1/SC29/WG 11 N3943, Jan. 2001.

Kamperman et al., "Call For Contributions on: Rights Management & Protection System Technologies," The TV-Anytime Forum. Sep. 24, 2001, retrieved from ftp://tva:tvaftp.bbc.co.uk/pub/Plenary/TV088r3.zip on Jun. 20, 2003.

Van Rijnsoever, B. J. et al., "Interoperable Content Protection for Digital TV," *2000 IEEE International Conference on New York*, Jul. 30, 2000, pp. 1407-1410.

Perritt, H. H., "Knowbots, Permissions Headers and Contract Law," *Proceedings Technological Strategies for Protecting Intellectual Property in the Networked Multimedia Environment*, Apr. 2, 1993, pp. 39-50.

* cited by examiner

RECEIVING APPARATUS

BACKGROUND OF THE INVENTION

1. Field of the Invention

The present invention relates to an apparatus for sending and to an apparatus for receiving a digital broadcast signal having multiplexed program information and video content coded for image compression.

2. Description of Related Art

FIG. 15 is a block diagram of a prior art transmission apparatus 502 and receiving apparatus 503. As shown in FIG. 15 the transmission apparatus 502 has an MPEG-2 Video-compliant (ISO/IEC 13818-2) video encoder 56, an MPEG-2 Audio-compliant (ISO/IEC 13818-3) audio encoder 57, program-specific information generator 59, and an MPEG-2 Systems-compliant (ISO/IEC 13818-1) multiplexer 66.

The receiving apparatus 503 has a demultiplexer 107, video decoder 112, and audio decoder 113.

Also shown in the figure are the digital video input signal 49, digital audio input signal 50, audio bitstream 64, video bitstream 76, program-specific information 500, multiplexed bitstream 501, video bitstream 110, audio bitstream 126, digital video signal 111, and digital audio signal 114.

The video encoder 56 of this prior art transmission apparatus 502 compresses the digital video input signal 49 according to the MPEG-2 Video standard to output video bitstream 76. The digital audio input signal 50 is similarly compression-coded by the audio encoder 57 to output MPEG-2-compliant audio bitstream 64. The program-specific information generator 59 generates program-specific information ("PSI" below) 500 describing the relationship between the video bitstream 76, audio bitstream 64, and program number. The multiplexer 66 then multiplexes the video bitstream 76, audio bitstream 64, and PSI 500 and outputs multiplexed bitstream 501.

The demultiplexer 107 of this prior art receiving apparatus 503 then demultiplexes the received multiplexed bitstream 501 into the video bitstream 110 and audio bitstream 126. The video bitstream 110 is then decompressed by the video decoder 112 and output as digital video signal 111. The audio bitstream 126 is likewise decompressed by the audio decoder 113 and output as digital audio signal 114.

Problem to be Solved by the Invention

A problem with the prior art system described above is that the audio and video bitstreams are not encrypted, and can be easily stolen by an unauthorized receiving apparatus.

Another problem is that even if the bitstreams are encrypted there is no protection against the encryption method itself being broken. More specifically, there is no means for preventing unauthorized reception of data sent by the transmission apparatus.

The present invention is directed to solving these problems, and an object of this invention is to provide protection assuring that data sent by the transmission apparatus can be safely received by the receiving apparatus.

SUMMARY OF THE INVENTION

To achieve these objects a transmission apparatus according to a first aspect of the present invention has encryption means for encrypting data and producing first encrypted data; program-specific information generating means for producing program-specific information containing a table denoting the correlation between first encrypted data and a program number of the first encrypted data; tool list generating means for producing a tool list containing a tool ID indicating a decoding tool for decrypting the first encrypted data; control graph generating means for producing a control graph indicating the embedded or instantiated location of the decoding tool in the receiving apparatus; rights information generating means for producing rights information for the first encrypted data; and multiplexing means for multiplexing the first encrypted data, program-specific information, tool list, control graph, and rights information.

A transmission apparatus according to a second aspect of the invention has encryption means for encrypting data and producing first encrypted data; tool list generating means for producing a tool list containing a tool ID indicating a decoding tool for decrypting the first encrypted data; control graph generating means for producing a control graph indicating the instantiated location of the decoding tool in the receiving apparatus; rights information generating means for producing rights information for the first encrypted data; and program-specific information generating means for producing program-specific information containing a table denoting the correlation between first encrypted data and a program number of the first encrypted data, the tool list, the control graph, and the rights information; and multiplexing means for multiplexing the first encrypted data and the program-specific information.

A transmission apparatus according to a third aspect of the invention has encryption means for encrypting data and producing first encrypted data; tool list generating means for producing a tool list containing a tool ID indicating a decoding tool for decrypting the first encrypted data; control graph generating means for producing a control graph indicating the instantiated location of the decoding tool in the receiving apparatus; program-specific information generating means for producing program-specific information containing a table denoting the correlation between first encrypted data and a program number of the first encrypted data, the tool list, the control graph, and the rights information; and rights information generating means for producing rights information for this data; rights information transmission means for outputting the rights information; and multiplexing means for multiplexing and outputting the first encrypted data and the program-specific information.

Preferably, the rights information transmission means relates the rights information to the data.

Alternatively, the program-specific information generating means relates the rights information to the data.

Further preferably, the multiplexing means multiplexes the decoding tool used for decryption.

Yet further preferably, the multiplexing means multiplexes key information enabling decryption.

A receiving apparatus according to an eighth aspect of the invention has demultiplexing means for separating a multiplexed signal containing first encrypted data into at least the first encrypted data and program-specific information; tool list demultiplexing means for separating a tool list having a tool ID indicating a decoding tool for decrypting the first encrypted data from the multiplexed signal; control graph demultiplexing means for separating a control graph indicating the instantiated location of the decoding tool in the receiving apparatus from the multiplexed signal; rights information demultiplexing means for demultiplexing rights information for the first encrypted data from the multiplexed signal; first control means for acquiring a tool according to a tool ID acquired from the tool list, and instantiating the tool according to the control graph; and first rights management means for processing the first encrypted data according to the rights information.

A receiving apparatus according to a ninth aspect of the invention has demultiplexing means for separating a multiplexed signal containing first encrypted data into at least the first encrypted data and program-specific information; tool list demultiplexing means for separating a tool list having a tool ID indicating a decoding tool for decrypting the first encrypted data from the multiplexed signal; control graph demultiplexing means for separating a control graph indicating the instantiated location of the decoding tool in the receiving apparatus from the program-specific information; rights information demultiplexing means for demultiplexing rights information for the first encrypted data from the program-specific information; first control means for instantiating a tool with a tool ID acquired from the tool list according to the control graph; and first rights management means for processing the first encrypted data according to the rights information.

A receiving apparatus according to a tenth aspect of the invention has demultiplexing means for separating a multiplexed signal containing first encrypted data into at least the first encrypted data and program-specific information; tool list demultiplexing means for separating a tool list having a tool ID indicating a decoding tool for decrypting the first encrypted data from the multiplexed signal; control graph demultiplexing means for separating a control graph indicating the instantiated location of the decoding tool in the receiving apparatus from the program-specific information; first control means for instantiating a tool with a tool ID acquired from the tool list according to the control graph; rights information receiving means for receiving rights information for the first encrypted data; and first rights management means for processing the first encrypted data according to the rights information.

Preferably, the receiving apparatus also has temporary storage means for temporarily storing the received first encrypted data; and reading means for reading the first encrypted data stored to the temporary storage means.

Yet further preferably, the receiving apparatus also has file management means for deleting from the temporary storage means the first encrypted data after the playback permit recorded in the rights information is expired.

Yet further preferably, the rights management means sends status information indicating how the first encrypted data was processed.

Yet further preferably, the receiving apparatus also has rights management means for separating the rights information into first rights information and second rights information; multiplexing adjusting means for rewriting rights information in the multiplexed signal to second rights information, and outputting a revised multiplexed signal. The revised multiplexed signal in this case is output to a second receiving apparatus according to a request signal from the second receiving apparatus.

Alternatively, the receiving apparatus also has rights management means for separating the rights information into first rights information and second rights information; wherein the second rights information and multiplexed signal are output to a second receiving apparatus according to a request signal from the second receiving apparatus.

Yet further preferably, the rights management means in one receiving apparatus receives data indicating how the first encrypted data was processed by a second receiving apparatus, and sends status information describing processing by said one receiving apparatus and the second receiving apparatus.

Yet further preferably, the receiving apparatus also has conversion means for converting the first encrypted data to second encrypted data; and remultiplexing means for remultiplexing the second encrypted data with the second rights information.

Yet further preferably, the first encrypted data is processed according to the first rights information.

Yet further preferably, the receiving apparatus also has file management means for deleting the first encrypted data from the temporary storage means after sending it to a second receiving apparatus.

Yet further preferably, the receiving apparatus also has video decoding means for extracting and decoding video data from the multiplexed signal, and/or audio decoding means for extracting and decoding audio data from the multiplexed signal.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying FIGS. 1 to 14.

Embodiment 1

Figure 1:
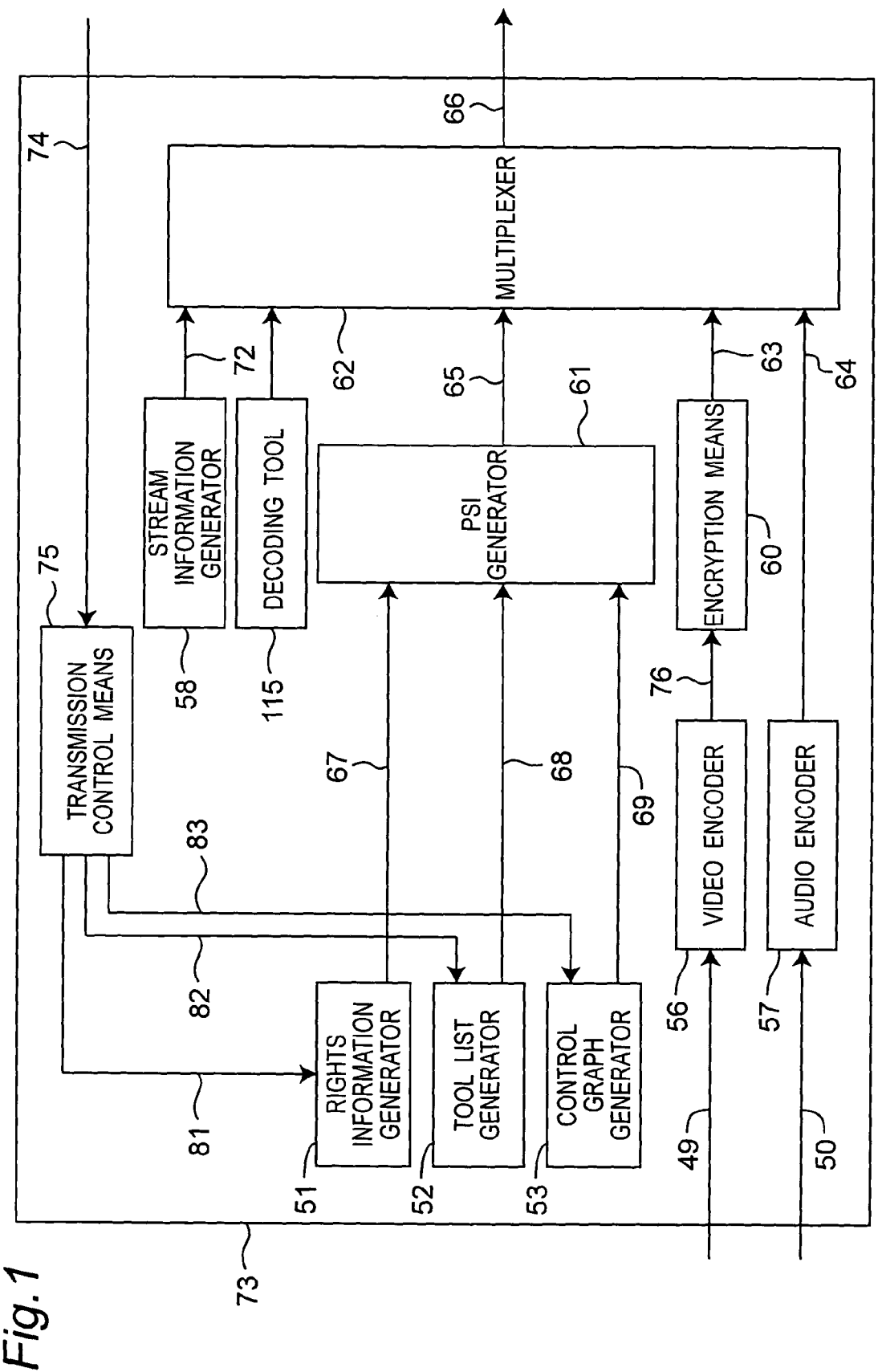
FIG. 1 is a schematic block diagram of a transmission apparatus according to a first embodiment of the present invention.

FIG. 1 is a block diagram showing a transmission apparatus according to a first embodiment of the present invention. In FIG. 1 the digital video input signal 49, digital audio input signal 50, video encoder 56, audio encoder 57, audio bitstream 64, and video bitstream 76 are the same as in the prior art configuration shown in FIG. 15. Also shown in FIG. 1 are a rights information generator 51, tool list generator 52, control graph generator 53, stream information generator 58 encryption means 60, program-specific information generator (below, "PSI generator") 61, an MPEG-2 Systems-compliant (ISO/IEC 13818-1) multiplexer 62, encrypted video bitstream 63, program-specific information 65, multiplexed bitstream 66, rights information 67 produced by the rights information generator 51, a tool list 68 produced by the tool list generator 52, a control graph 69 produced by the control graph generator 53, stream information 72, first transmission apparatus 73, status information 74, transmission control means 75, rights control information 81, tool control information 82, graph control information 83, and decoding tool 115.

It should be noted that the encryption means 60 uses a 128-bit key for AES-compliant (Advanced Encryption Standard) encryption.

Referring to FIG. 1, the digital video input signal 49 is compression-coded to an MPEG-2-compliant video bitstream 76 by the video encoder 56, and then encrypted by a first encryption means 60 for output as encrypted video bitstream 63.

The digital audio input signal 50 is similarly compression-coded by the audio encoder 57, and output as audio bitstream 64;

Exemplary status information 74 is shown in Table 1. The values in Table 1 are 8-bit words of bits 7 to 0. Status information and content is exchanged between a transmission apparatus with a transmission device ID, and a receiving apparatus with a receiving device ID. The status information contains the value fields shown in the left column of Table 1. The corresponding field values (content) are shown in the right column.

TABLE 1

| Status information | |
|---|---|
| Tool request | 0X10000000 |
| Content request | 0X01000000 |
| Copy information | 0X00100000 |
| Playback count | 0X00010000 |
| Editing | 0X00001000 |

The rights information generator 51 produces rights information specifying the conditions under which a user is permitted to use the encoded content stream, and supplies the rights information to the PSI generator 61. The values shown in Table 2 are written to the corresponding content (value) fields in Table 1 to specify the rights for copying, playing (tracked using a playback count), or editing the encoded bitstream content.

It should be noted that a program as used herein means an AV program with added program-specific information.

TABLE 2

| Copying | once | 0X00000000 |
|---|---|---|
| | prohibited | 0X00000001 |
| Playback count | | 1Xnnnnnnnn |
| Editing | allowed | 0X00000010 |
| | prohibited | 0X00000011 |

This first embodiment of the invention enables two types of programs, A and B. Program type A is sent with the values shown in Table 3, enabling the program to be copied once, played once, but not edited.

TABLE 3

| Content | | Program A |
|---|---|---|
| Copying | once | 0X00000000 |
| Playback count | | 1X00000001 |
| Editing | prohibited | 0X00000011 |

User actions (rights) allowed with program type B are sent as shown in Table 4, enabling the program to be copied once, played three times, but not edited.

TABLE 4

| Content | | Program B |
|---|---|---|
| Copying | once | 0X00000000 |
| Playback count | | 1X00000003 |
| Editing | prohibited | 0X00000011 |

The transmission apparatus 73 is assumed to recognize that there is a decoding tool 115 having a tool ID (0X00A) enabling AES decryption. The tool list generator 52 generates a list of tools required on the receiver side, and passes this list to the PSI generator 61. More specifically, the tool list generator 52 produces a tool list with the above-noted tool ID (0X00A) indicating that decoding tool 115 is required to receive and play the MPEG-2 Video bitstream.

Figure 2:
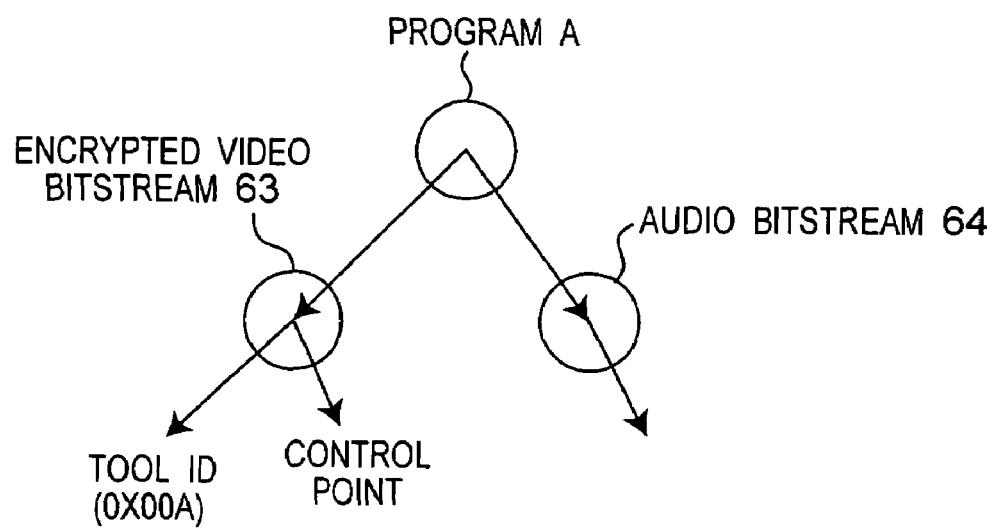
FIG. 2 is a control graph showing operation of the first embodiment of the invention.

The configuration of the control graph 69 is shown in part in FIG. 2. Program A contains encrypted video bitstream 63 and audio bitstream 64, a tool ID for the encrypted video bitstream 63, and a control point indicating the location of the tool. Program B is similarly configured.

The control graph generator 53 produces a control graph 69 indicating that the tool having the tool ID (0X00A) enabling AES decryption is located directly before the video decoder of the receiving apparatus, and outputs the control graph 69 to the PSI generator 61.

The PSI generator 61 generates program-specific information 65 containing rights information 67, tool list 68, control graph 69, and a relation table indicating the relationship between the encrypted video bitstream 63, audio bitstream 64, and program number of the program.

The stream information generator 58 produces stream information 72 containing key information and other data for decrypting the encryption applied by the encryption means 60.

The multiplexer 62 multiplexes the encrypted video bitstream 63, audio bitstream 64, program-specific information 65, stream information 72, and decoding tool 115 to conform with the MPEG-2 Systems standard, and thus outputs multiplexed bitstream 66.

By receiving status information 74 from another device, the transmission control means 75 can know how the rights information 67 approved by a transmission apparatus according to this first embodiment of the invention was processed by another device. If the rights information for program B shown in Table 4 is received by a transmission apparatus according to this embodiment of the invention as status information 74 shown in Table 5, the transmission apparatus knows that the content was copied once and played twice.

TABLE 5

| Content | | Program B |
|---|---|---|
| Copying | prohibited | 0X00000001 |
| Playback count | | 1X00000001 |
| Editing | prohibited | 0X00000011 |

As described above the multiplexed bitstream downloaded to the receiving apparatus in the present invention includes with the encrypted data a tool list for content decryption, the decryption tool, the tool location, decryption key information, and rights information. The transmission apparatus according to this embodiment of the present invention can therefore always provide the most recent protection, and can process the protection method as part of the program-specific information in the multiplexed data.

The rights information 67, tool list 68, and control graph 69 are applied to the PSI generator 61 in this first embodiment described above, but it could be applied directly to the multiplexer 62. A simpler transmission apparatus can be provided in this case because the rights information 67, tool list 68, and control graph 69 are not contained in the program-specific information.

Second Embodiment

Figure 3:
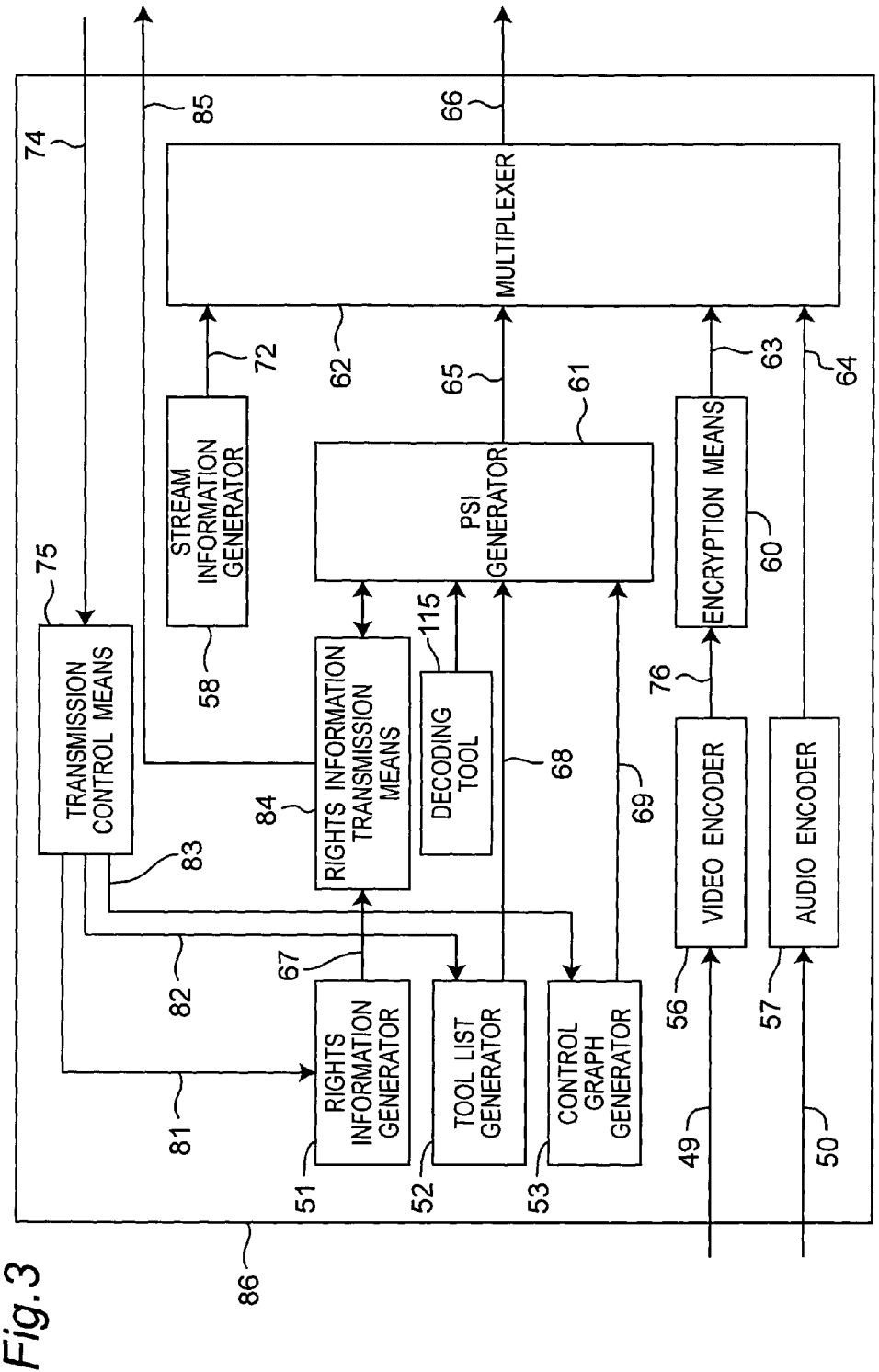
FIG. 3 is a schematic block diagram of a transmission apparatus according to a second embodiment of the present invention.
Figure 15:
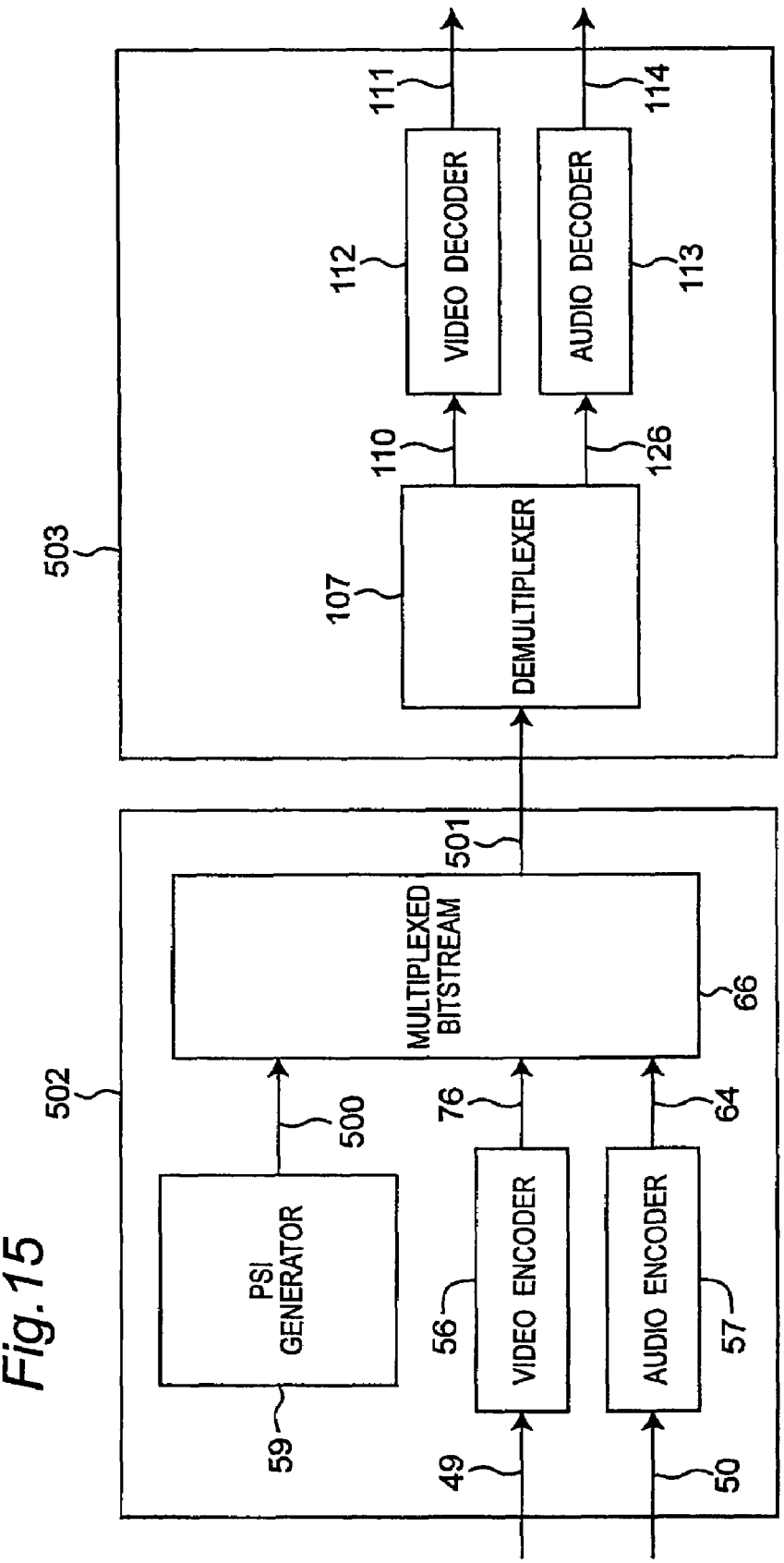
FIG. 15 is a schematic block diagram of the prior art.

FIG. 3 is a block diagram of a transmission apparatus according to a second embodiment of the invention. It should be noted that like parts in FIG. 3, FIG. 15, and FIG. 1 are identified by like reference numerals. This second embodiment differs from the first in the rights information transmission means 84, transmission rights information 85, and second transmission apparatus 86.

Referring to FIG. 3, the digital video input signal 49 is compressed to an MPEG-2-standard video bitstream 76 by the video encoder 56, then encrypted by the encryption means 60 and output as encrypted video bitstream 63. The digital audio input signal 50 is similarly compressed by the audio encoder 57, and output as audio bitstream 64.

The status information 74 in this case is as shown in Table 1. The rights information generator 51 produces rights information declaring content usage conditions for a content stream, and supplies the rights information to the rights information transmission means 84. The rights information 67 is shown in Table 6 in this case.

TABLE 6

| Copying | once | 0X00000000 |
|---|---|---|
| | prohibited | 0X00000001 |
| Playback count | | 1Xnnnnnnnn |
| Editing | allowed | 0X00000010 |
| | prohibited | 0X00000011 |

This second embodiment of the invention enables two types of programs, A and B. Program type A is sent with the values shown in Table 7, enabling the program to be copied once, played once, but not edited. The rights information shown in Table 7 corresponds to the user actions allowed with program A.

TABLE 7

| Content | | Program A |
|---|---|---|
| Copying | once | 0X00000000 |
| Playback count | | 1X00000001 |
| Editing | prohibited | 0X00000011 |

User actions (rights) allowed with program type B are sent as shown in Table 8, enabling the program to be copied once, played three times, but not edited. The rights information shown in Table 8 corresponds to the user actions allowed with program B.

TABLE 8

| Content | | Program B |
|---|---|---|
| Copying | once | 0X00000000 |
| Playback count | | 1X00000003 |
| Editing | prohibited | 0X00000011 |

The transmission apparatus 86 is assumed to recognize that there is a decoding tool 115 having a tool ID (0X00A) enabling AES decryption. The tool list generator 52 generates a list of tools required on the receiver side, and passes this list to the PSI generator 61. More specifically, the tool list generator 52 produces a tool list 68 with the above-noted tool ID (0X00A) indicating that the decoding tool 115 is required to receive and play the MPEG-2 Video bitstream.

The configuration of the control graph is shown in FIG. 2. Program A contains a first encrypted video bitstream 63 and audio bitstream 64, a tool ID for the first encrypted video bitstream 63, and a control point denoting the location of the tool. Program B is similarly configured.

The control graph generator 53 produces a control graph 69 indicating that the tool having the tool ID (0X00A) enabling AES decryption is located before the video decoder of the receiving apparatus, and outputs the control graph 69 to the PSI generator 61.

The PSI generator 61 generates program-specific information 65 containing tool list 68, control graph 69, decoding tool 115, and a relation table indicating the relationship between the encrypted video bitstream 63, audio bitstream 64, and program number of the program.

The stream information generator 58 produces stream information 72 containing key information and other data for decrypting the encryption applied by the encryption means 60.

The multiplexer 62 multiplexes the encrypted video bitstream 63, audio bitstream 64, program-specific information 65, and stream information 72 to conform with the MPEG-2 Systems standard, and thus outputs multiplexed bitstream 66.

The rights information transmission means 84 relates rights information 67 to a specific program. This correlation with a particular program is possible because a relation table denoting the relationship between the encrypted video bitstream 63, audio bitstream 64, and program number of the program can be obtained by communication with the PSI generator 61, and can then be converted to a file for transmission as transmission rights information 85.

The rights information can be handled separately from the multiplexed data because the rights information is sent separately from the multiplexed data, and the rights information can therefore be rewritten and sent to another receiving apparatus without the first receiving apparatus remultiplexing the content data.

By receiving status information 74 from another device, the transmission control means 75 can know how the rights information 67 approved by a transmission apparatus according to this second embodiment of the invention was processed by another device. If the rights information for program B shown in Table 8 is received by a transmission apparatus according to this embodiment of the invention as the rights information shown in Table 9, the transmission apparatus knows that the content was copied once and played twice.

TABLE 9

| Copying | prohibited | 0X00000001 |
|---|---|---|
| Playback count | | 1X00000001 |
| Editing | prohibited | 0X00000011 |

As described above the tool list for content decryption, the decryption tool, the tool location, decryption key information, and rights information can be downloaded with the encrypted data as part of the multiplexed data to the receiving apparatus. As a result, the tools can be updated, and the most recent protection tools can always be provided. Furthermore, because the rights information can be sent as a file separately to the multiplexed data, a transmission apparatus of our invention does not need to re-multiplex the content bitstream when one receiving apparatus rewrites and sends the rights information to another receiving apparatus.

In addition to the above benefits, the transmission apparatus according to this embodiment of the invention can correctly relate rights information to the multiplexed data when multiple multiplexed data streams are present because the rights information can be sent separately from the multiplexed data and the rights information can be linked to a particular multiplexed data stream.

Third Embodiment

Figure 4:
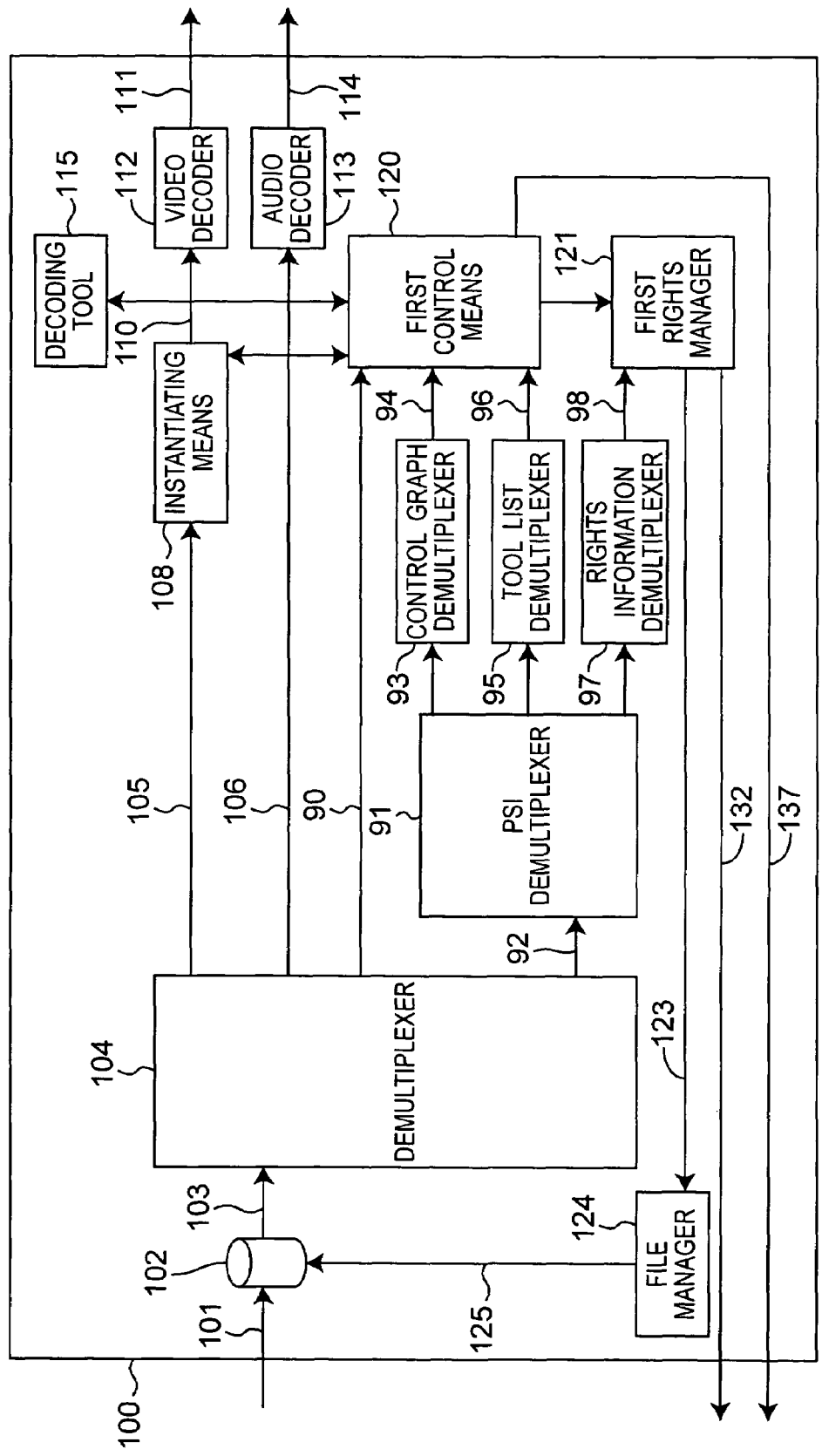
FIG. 4 is a schematic block diagram of a receiving apparatus according to a third embodiment of the present invention.

FIG. 4 is a block diagram of a receiving apparatus according to a third embodiment of the present invention. In FIG. 4 reference numerals 111 to 114 denote the same parts as indicated by the same reference numerals in the prior art example shown in FIG. 15. Also shown in FIG. 4 are a first receiving apparatus 100, a first input multiplexed bitstream 101 conforming to the MPEG-2 Systems standard, a hard disk drive 102, a read multiplexed bitstream 103 read from the hard disk drive 102 and input to demultiplexer 104, instantiating means 108, video bitstream 110, decoding tool 115 for decrypting AES encryption, first control means 120, first rights manager 121, file management information 123, file manager 124, hard disk drive control command 125 applied to the hard disk drive 102, read information 90 including stream information and decoding tool 115, program-specific information (PSI) demultiplexer 91, program-specific information 92, control graph demultiplexer 93, control graph information 94, tool list demultiplexer 95, tool list 96, rights information demultiplexer 97, rights information 98, first reply information 132, and first request information 137.

The first receiving apparatus 100 is connected to the first transmission apparatus 73.

Referring to FIG. 4, the MPEG-2 Systems-compliant first input multiplexed bitstream 101 is first stored to the hard disk drive 102, and is then read from the disk drive 102 and applied to the demultiplexer 104 as read multiplexed bitstream 103. The demultiplexer 104 separates the read multiplexed bitstream 103 into a first encrypted video bitstream 105, audio bitstream 106, program-specific information 92, and read information 90.

The program-specific information 92 describes the relationship between the first encrypted video bitstream 105, audio bitstream 106, and program number of the program, as well as the rights information 98 for the program, tool list 96 containing the tool ID (0X00A) for AES decryption, and control graph 94 indicating that the decryption tool is instantiated between the demultiplexer 104 and video decoder 112 of the first receiving apparatus 100. Key information for decrypting the first encrypted video bitstream 105 is also contained in the read information 90.

The read information 90 is then demultiplexed by the demultiplexer 104 and applied to the first control means 120. The program-specific information 92 is applied to the PSI demultiplexer 91. The control graph demultiplexer 93 extracts the control graph 94 from the PSI demultiplexer 91, and supplies it to the first control means 120. The tool list demultiplexer 95 extracts the tool list 96 from the PSI demultiplexer 91, and supplies it to the first control means 120. The rights information demultiplexer 97 extracts the rights information 98 from the PSI demultiplexer 91, and supplies it to the first rights manager 121.

The first control means 120 transmits the first request information 137 as shown in Table 10. This first request information 137 sends a tool request and content (i.e., program) request.

TABLE 10

| Tool request | 0X10000000 |
|---|---|
| Content request | 0X01000000 |

The first control means 120 knows from the tool list 96 that decoding tool 115 is the tool needed for decryption, knows from the control graph 94 that the control point for applying the decoding tool 115 is 108, and extracts the descrambling key from the read information 90.

The first control means 120 sends a command for instantiating the decoding tool 115 and key information extracted from the read information 90 to the instantiating means 108 according to the control graph 94, which indicates that the decoding tool 115 is instantiated between the demultiplexer 104 and video decoder 112 of the first receiving apparatus 100. The instantiating means 108 then embeds the decoding tool 115 and key information. The first encrypted video bitstream 105 is then decrypted by the instantiating means 108, and output as video bitstream 110.

The video bitstream 110 is then decompressed by the video decoder 112 and output as digital video signal 111. The audio bitstream 106 is expanded by the audio decoder 113, and output as digital audio signal 114.

The first rights manager 121 acquires the rights information 98, and outputs file management information 123 to the file manager 124. Because the playback count assigned with the value shown in Table 4 is only once with program A, the file manager 124 sends a hard disk drive control command 125 to the hard disk drive 102 to erase the stored program A once the program has been read once.

The first rights manager 121 sends the information shown in Table 11 as the first reply information 132. This reply shows that the program has been played once by the first receiving apparatus 100.

TABLE 11

| | | |
|---|---|---|
| Copying | allowed | 0X00000000 |
| No. times played by 1st receiver | | 1X00000001 |

Fourth Embodiment

Figure 5:
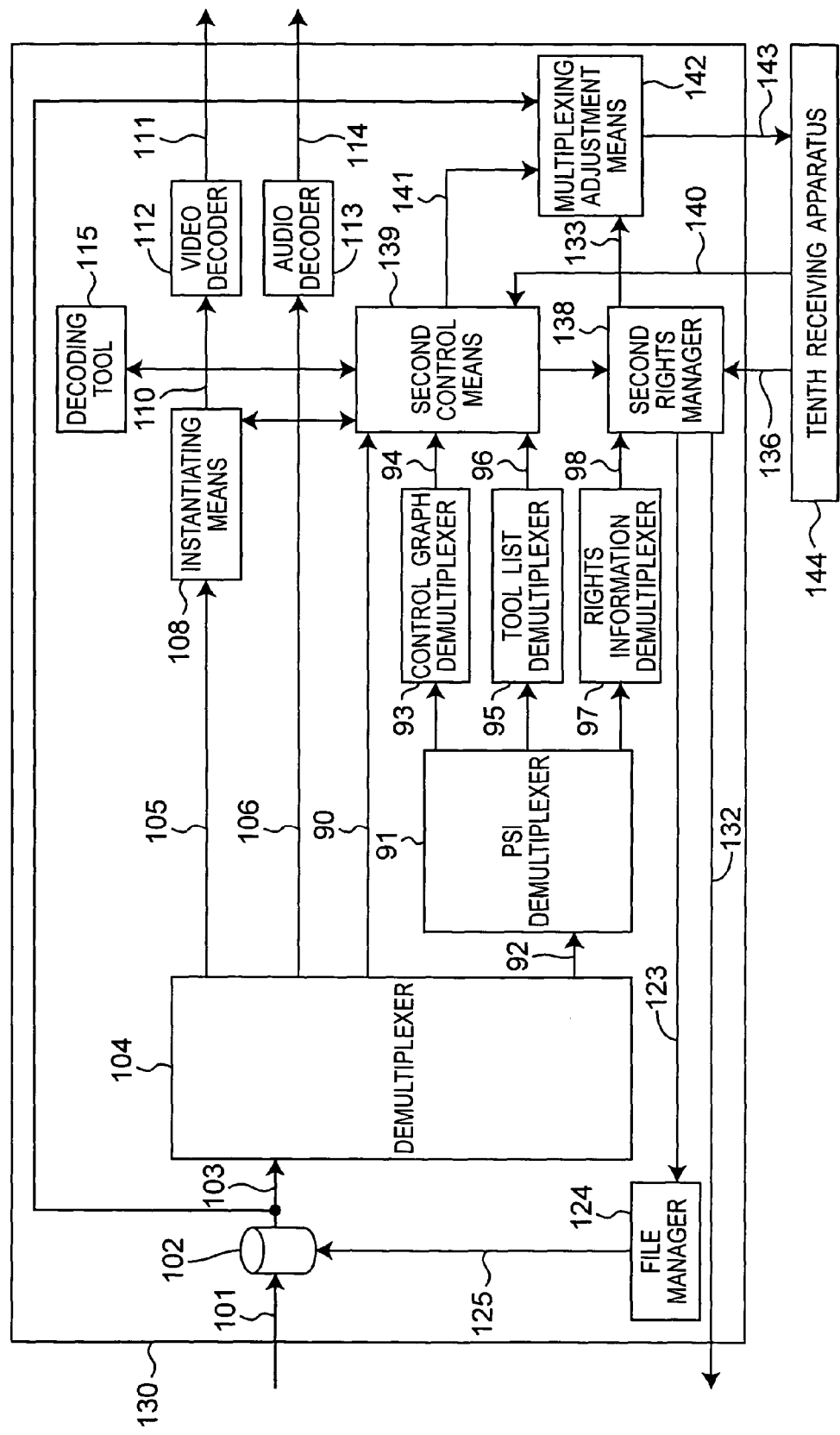
FIG. 5 is a schematic block diagram of a receiving apparatus according to a fourth embodiment of the present invention.

FIG. 5 is a block diagram showing a receiving apparatus according to a fourth embodiment of the present invention. In this fourth embodiment of the invention a first receiving apparatus can download tools to another receiving apparatus connected via a network, can send digital data, and can send consumption information to the server.

Referring to FIG. 5, reference numerals 111 to 114 denote the same parts as indicated by the same reference numerals in the prior art example shown in FIG. 15, and reference numerals 90 to 98, 101 to 106, 108, 110, 115, 123 to 125, and 132 denote the same parts referenced thereby in the third embodiment.

Also shown in FIG. 5 is a second receiving apparatus 130 having second rights information 133, second reply information 136, second rights manager 138, second control means 139, second request information 140, first control information 141, multiplexing adjustment means 142, second MPEG-2 Systems-compliant multiplexed bitstream 143, and tenth receiving apparatus 144.

Figure 6:
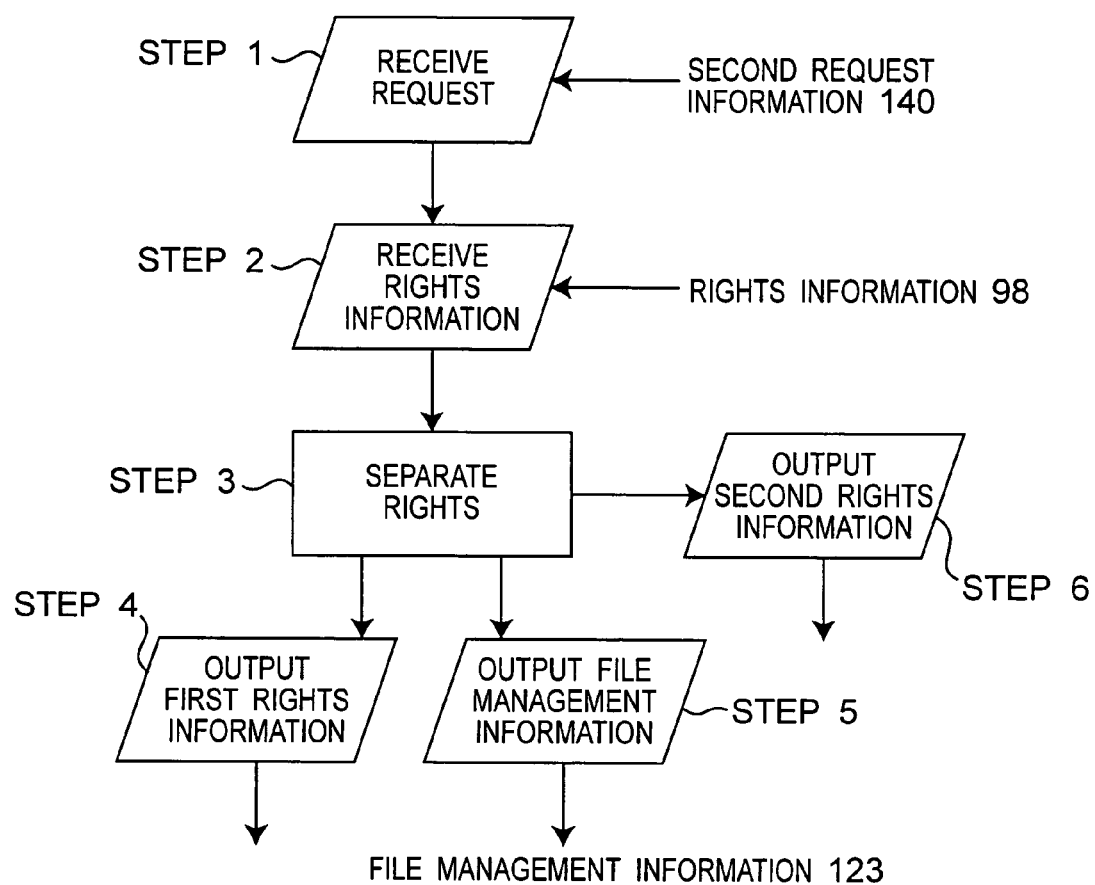
FIG. 6 is a schematic flow chart showing the operation of the second rights manager in a fourth embodiment of the present invention.
Figure 7:
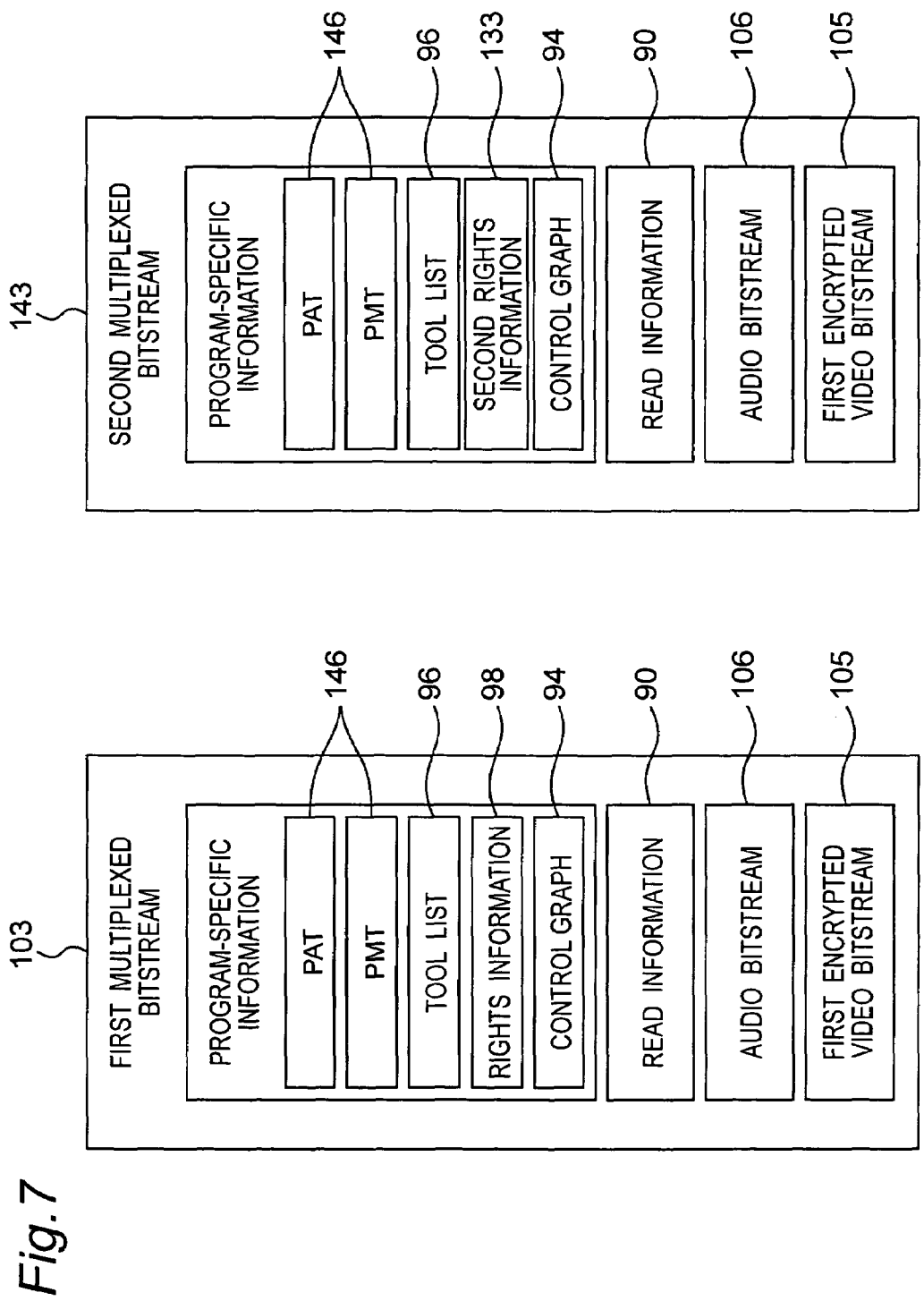
FIG. 7 shows the structure of the multiplexed bitstream in a fourth embodiment of the present invention.

FIG. 6 is a flow chart of the process run by the second rights manager 138. FIG. 7 schematically shows the structure of the first multiplexed bitstream 103 and second multiplexed bitstream 143 where relation table 146 describes the relationship between the encrypted video bitstream 63, audio bitstream 64, and program number of program A.

The second receiving apparatus 130 in FIG. 5 is connected to first transmission apparatus 73, and the receiving apparatus 144 connected to the second receiving apparatus 130 is functionally equivalent to the first receiving apparatus 100 shown in FIG. 4.

Referring again to FIG. 5, the read information 90 is demultiplexed by the demultiplexer 104 and applied to the second control means 139. The second control means 139 sends rights approval information to the second rights manager 138, and sends the first control information 141 containing multiplexed bitstream adjustment information to the multiplexing adjustment means 142.

The second control means 139 then receives the second request information 140 shown in Table 12 from the tenth receiving apparatus 144. Table 12 shows that the receiving apparatus 144 is sending tool and content requests to the second receiving apparatus 130.

TABLE 12

| | |
|---|---|
| Tool request | 0X10000000 |
| Content request | 0X01000000 |

FIG. 6 shows part of the operation of the second rights manager 138.

Second request information 140 is received through the second control means 139 in step 1, and rights information 98 is received in step 2. The rights information 98 is then separated into the first rights information used by the second receiving apparatus 130 and the second rights information 133 used by the tenth receiving apparatus 144 in step 3.

The first rights information is output in step 4, file management information 123 is output to the file manager 124 based on the first rights information in step 5, and second rights information 133 is output in step 6.

If a program B with rights information set as shown in Table 4 is played once by the second receiving apparatus 130 and sent to the first receiving apparatus, the first and second rights information are respectively written as shown in Table 13 and Table 14. Note that because the program was played once by the second receiving apparatus 130, the playback count shown in Table 14, denoting the second rights information sent to the tenth receiving apparatus 144, is reduced one.

TABLE 13

| | | |
|---|---|---|
| Copying | prohibited | 0X00000001 |
| Playback count | | 1X00000001 |
| Editing | prohibited | 0X00000011 |

TABLE 14

| | | |
|---|---|---|
| Copying | prohibited | 0X00000001 |
| Playback count | | 1X00000002 |
| Editing | prohibited | 0X00000011 |

The second rights manager 138 sends the second rights information 133 shown in Table 14 to the multiplexing adjustment means 142. The multiplexing adjustment means 142 then modifies the content of the first multiplexed bitstream 103 based on the second rights information 133. More specifically, the rights information 122 of the first multiplexed bitstream 103 is changed to the content of the second rights information 133, and the result is output as second multiplexed bitstream 143.

FIG. 7 shows the configuration of the first and second multiplexed bitstreams. The rights information 98 is applied to the multiplexing adjustment means 142 as second rights information 133 by the second rights manager, and the second multiplexed bitstream 143 thus contains the second rights information.

Based on the control graph 94 indicating that the instantiated location of the decoding tool 115 is between the demultiplexer 104 of the second receiving apparatus 130 and the video decoder 112, the second control means 139 outputs a command to the instantiating means 108 to embed the decoding tool 115 and key information extracted from the read information 90, and the instantiating means 108 then embeds the decoding tool 115 and key information. The first encrypted video bitstream 105 is decrypted by the instantiating means 108 and output as video bitstream 110, and is then decoded by the video decoder 112 and output as the digital video signal.

Operation is otherwise the same as in the third embodiment. A second receiving apparatus 130 according to this embodiment of the invention can therefore send received rights information, bitstreams, and tool information to a tenth receiving apparatus 144 connected thereto over a network.

The second rights manager 138 then outputs the first reply information 132 based on the second reply information 136 from tenth receiving apparatus 144. First reply information configured as shown in Table 15 is then output because the content stream was played once by second receiving apparatus 130 and once by tenth receiving apparatus 144.

TABLE 15

| | |
|---|---|
| No. times played by 2nd receiver | 0X00000001 |
| No. times played by 1st receiver | 0X00000001 |

The transmission apparatus according to this embodiment of the invention can thus acquire content consumption information from both the second receiving apparatus 130 and a tenth receiving apparatus 144 connected to the second receiving apparatus 130.

Fifth Embodiment

Figure 8:
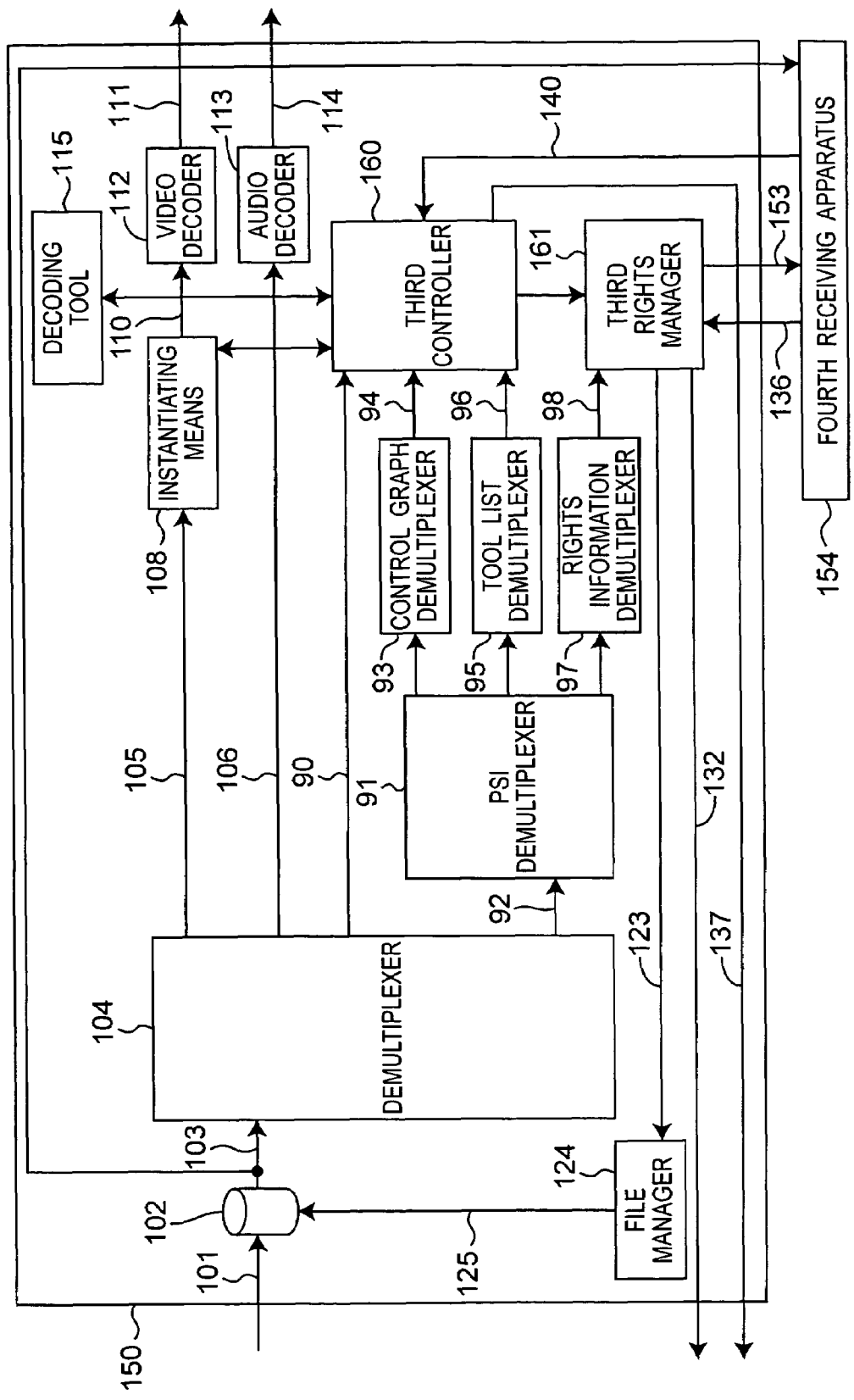
FIG. 8 is a schematic block diagram of a receiving apparatus according to a fifth embodiment of the present invention.

FIG. 8 is a block diagram showing a receiving apparatus according to a fifth embodiment of the present invention. This embodiment of the invention can download rights information received by a receiving apparatus, can send digital data to another receiving apparatus connected via a network, and can send consumption information to the server.

Referring to FIG. 8, reference numerals 111 to 114 denote the same parts as indicated by the same reference numerals in the prior art example shown in FIG. 15, reference numerals 90 to 98, 101 to 106, 108, 110, 115, 123 to 125, 132 and 137 denote the same parts referenced thereby in the third embodiment shown in FIG. 4, and reference numerals 136 and 140 are the same as in the fourth embodiment shown in FIG. 5.

Also shown in FIG. 8 are third receiving apparatus 150, third rights information 153, fourth receiving apparatus 154, third controller 160, and third rights manager 161.

In FIG. 8 the third controller 160 receives second request information 140 as shown in Table 16 from the fourth receiving apparatus 154. Table 16 shows that the fourth receiving apparatus 154 is requesting a tool and content from the third receiving apparatus 150. The third controller 160 sends rights approval information to the third rights manager 161.

TABLE 16

| Tool request | 0X10000000 |
|---|---|
| Content request | 0X01000000 |

The read information 90 is separated by the demultiplexer 104 and applied to the third controller 160. The third rights manager 161 separates the rights information 98 into the first rights information used by the third receiving apparatus 150, and the third rights information 153 used by the fourth receiving apparatus 154, and sends the third rights information 153 to the fourth receiving apparatus 154.

If the content is played once by third receiving apparatus 150 and once by fourth receiving apparatus 154, the first rights information and third rights information 153 are as shown in Table 17 and Table 18. Note that the playback count shown in Table 18 is reduced one because the content was played by the third receiving apparatus 150.

TABLE 17

| Copying | prohibited | 0X00000000 |
|---|---|---|
| Playback count | | 1X00000001 |
| Editing | prohibited | 0X00000011 |

TABLE 18

| Copying | prohibited | 0X00000001 |
|---|---|---|
| Playback count | | 1X00000002 |
| Editing | prohibited | 0X00000011 |

Operation is otherwise as described in the third embodiment. As a result, this third receiving apparatus 150 can send received rights information, bitstreams, and tool information to the fourth receiving apparatus 154.

Sixth Embodiment

Figure 9:
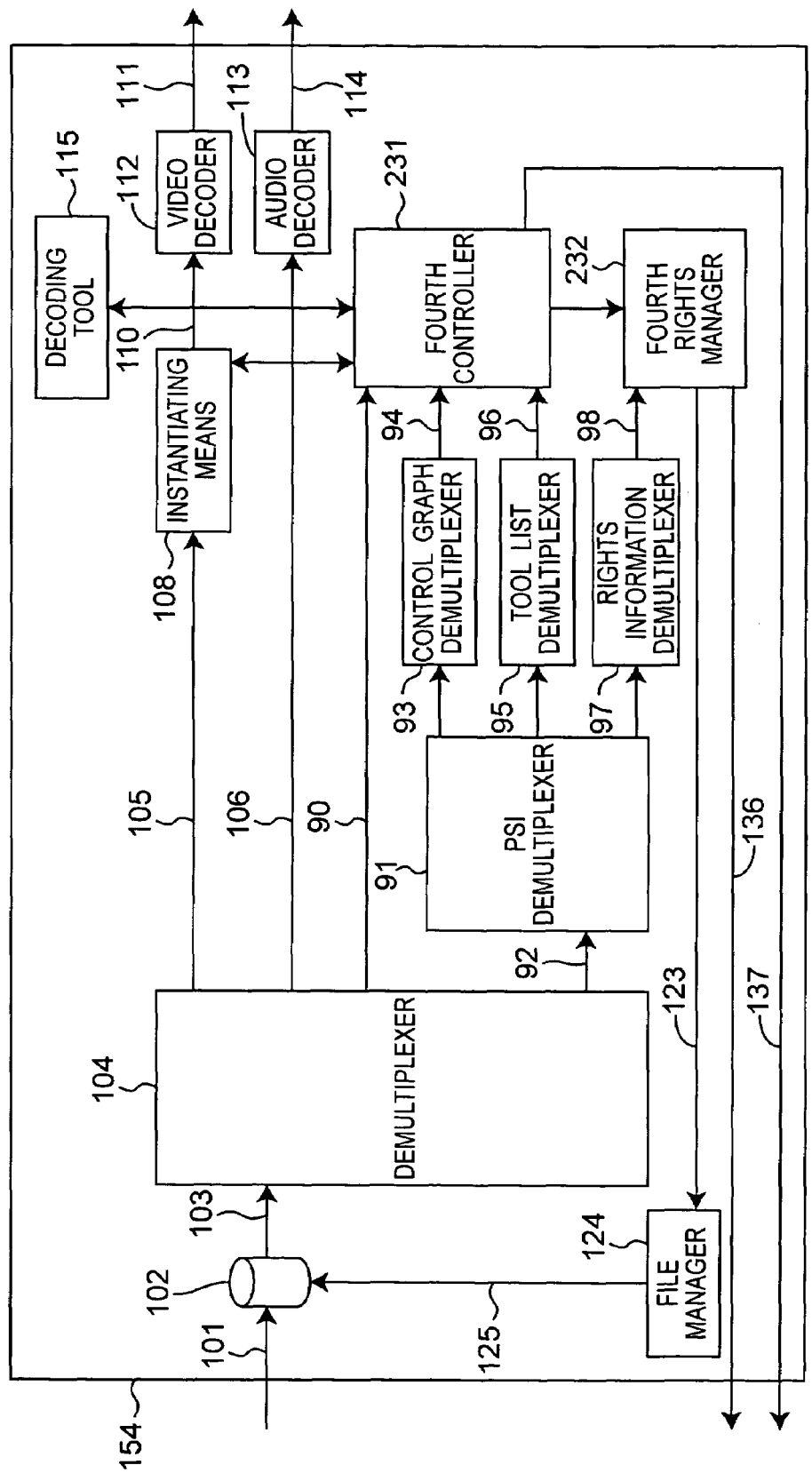
FIG. 9 is a schematic block diagram of a receiving apparatus according to a sixth embodiment of the present invention.

FIG. 9 is a block diagram showing a receiving apparatus according to a sixth embodiment of the present invention. This embodiment of the invention relates to a fourth receiving apparatus connected to the third receiving apparatus over a home network.

Referring to FIG. 9, reference numerals 111 to 114 denote the same parts as indicated by the same reference numerals in the prior art example shown in FIG. 15, reference numerals 90 to 98, 101 to 106, 108, 110, 115, 123 to 125, and 132 denote the same parts referenced thereby in the third embodiment shown in FIG. 4, and reference numeral 136 is the same as in the fourth embodiment shown in FIG. 5.

Also shown in FIG. 9 are fourth receiving apparatus fourth receiving apparatus 154, fourth controller 231, and fourth rights manager 232.

In FIG. 9 the read information 90 is separated by the demultiplexer 104 and applied to fourth controller 231. Based on the rights information 98 and rights consumption by the fourth receiving apparatus 154, fourth rights manager 232 generates the second reply information 136.

The playback count in this second reply information 136 is reduced by one because the video decoder 112 and digital audio signal 114 played by the fourth receiving apparatus. As a result, the rights information for program B as shown in Table 18 is rewritten as shown in Table 19.

TABLE 19

| Content | allowed | Program B |
|---|---|---|
| Copying | prohibited | 0X00000001 |
| Playback count | | 1X00000001 |
| Editing | prohibited | 0X00000011 |

The second reply information 136 rewritten as shown in Table 19 is then sent from the fourth rights manager 232. Operation is otherwise the same as in the third embodiment shown in FIG. 4.

Seventh Embodiment

Figure 10:
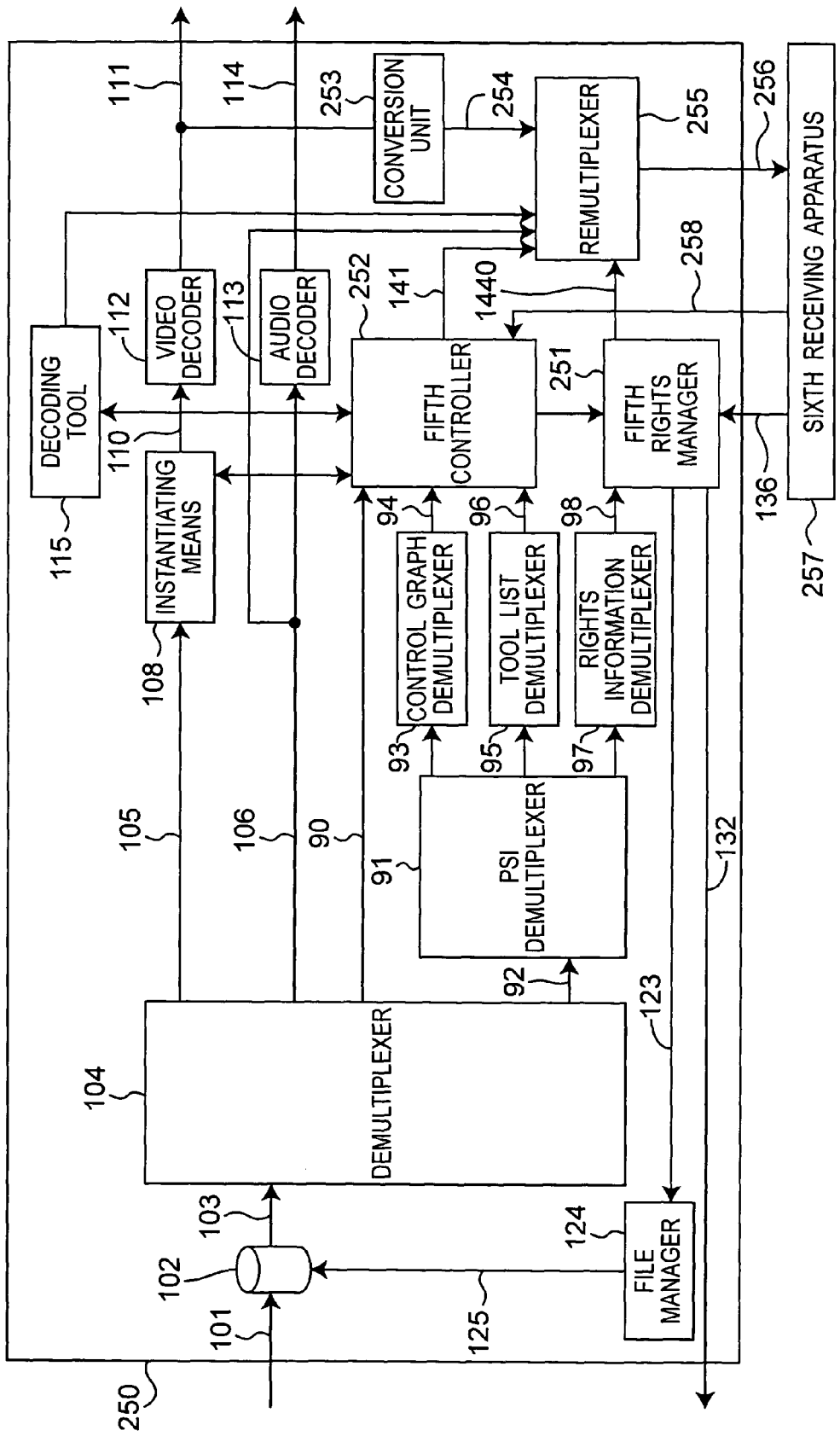
FIG. 10 is a schematic block diagram of a receiving apparatus according to a seventh embodiment of the present invention.

FIG. 10 is a block diagram showing a receiving apparatus according to a seventh embodiment of the present invention. This embodiment of the invention can download received rights information to a receiving apparatus, convert and send digital data to another receiving apparatus, and can send rights consumption information to a server.

Referring to FIG. 10, reference numerals 111 to 114 denote the same parts as indicated by the same reference numerals in the prior art example shown in FIG. 15, reference numerals 90 to 98, 101 to 106, 110, 115, 123 to 125, and 132 denote the same parts referenced thereby in the third embodiment shown in FIG. 4, and reference numeral 141 is the same as in the fourth embodiment shown in FIG. 5.

Also shown in FIG. 10 are fourth rights information 1440, fifth receiving apparatus 250, fifth rights manager 251, fifth controller 252, conversion unit 253, second encrypted video bitstream 254, remultiplexer 255, third MPEG-2 Systems-compliant multiplexed bitstream 256, sixth receiving apparatus 257, and third request information 258.

In FIG. 10 the read information 90 is separated by the demultiplexer 104 and applied to fifth controller 252. The fifth rights manager 251 segments the rights information 98 into first rights information used by the fifth receiving apparatus 250 and fourth rights information 1440 used by sixth receiving apparatus 257, and sends the fourth rights information 1440 to remultiplexer 255.

The fifth controller 252 is assumed to receive third request information 258 as shown in Table 20 from the sixth receiving apparatus 257. Table 20 shows that the sixth receiving apparatus 257 sent tool and content requests to the fifth receiving apparatus 250. The fifth controller 252 sends rights approval information to the fifth rights manager 251, and sends first control information 141 containing a remultiplex command to the remultiplexer 255.

TABLE 20

| Tool request | 0X10000000 |
|---|---|
| Content request | 0X01000000 |

If the content was played once by fifth receiving apparatus 250 and once by sixth receiving apparatus 257, the first rights information and fourth rights information 1440 are as shown in Table 21 and Table 22, respectively. The playback count is decremented by one in Table 22 because the stream was played once by fifth receiving apparatus 250.

TABLE 21

| Copying | prohibited | 0X00000000 |
|---|---|---|
| Playback count | | 1X00000001 |
| Editing | prohibited | 0X00000011 |

TABLE 22

| Copying | prohibited | 0X00000001 |
|---|---|---|
| Playback count | | 1X00000002 |
| Editing | prohibited | 0X00000011 |

The conversion unit 253 converts the digital video signal 111 to a compressed MPEG-4 Video-compliant (ISO/IEC 14496) stream, encrypts the compressed stream, and outputs second encrypted video bitstream 254.

The decoding tool 115 is also sent to the remultiplexer 255. The remultiplexer 255 then remultiplexes the second encrypted video bitstream 254, audio bitstream 126, first control information 141, tenth receiving apparatus 144, and decoding tool 115 to an MPEG-2 Systems stream, and thus outputs third multiplexed bitstream 256.

The audio bitstream 106 is used in this seventh embodiment of the invention, but the digital audio signal 114 could be recompressed and used.

Operation is otherwise as in the third embodiment shown in FIG. 4. As a result the fifth receiving apparatus 250 can send the received rights information, bitstream, tool information, and other data to the sixth receiving apparatus 257.

Eighth Embodiment

Figure 11:
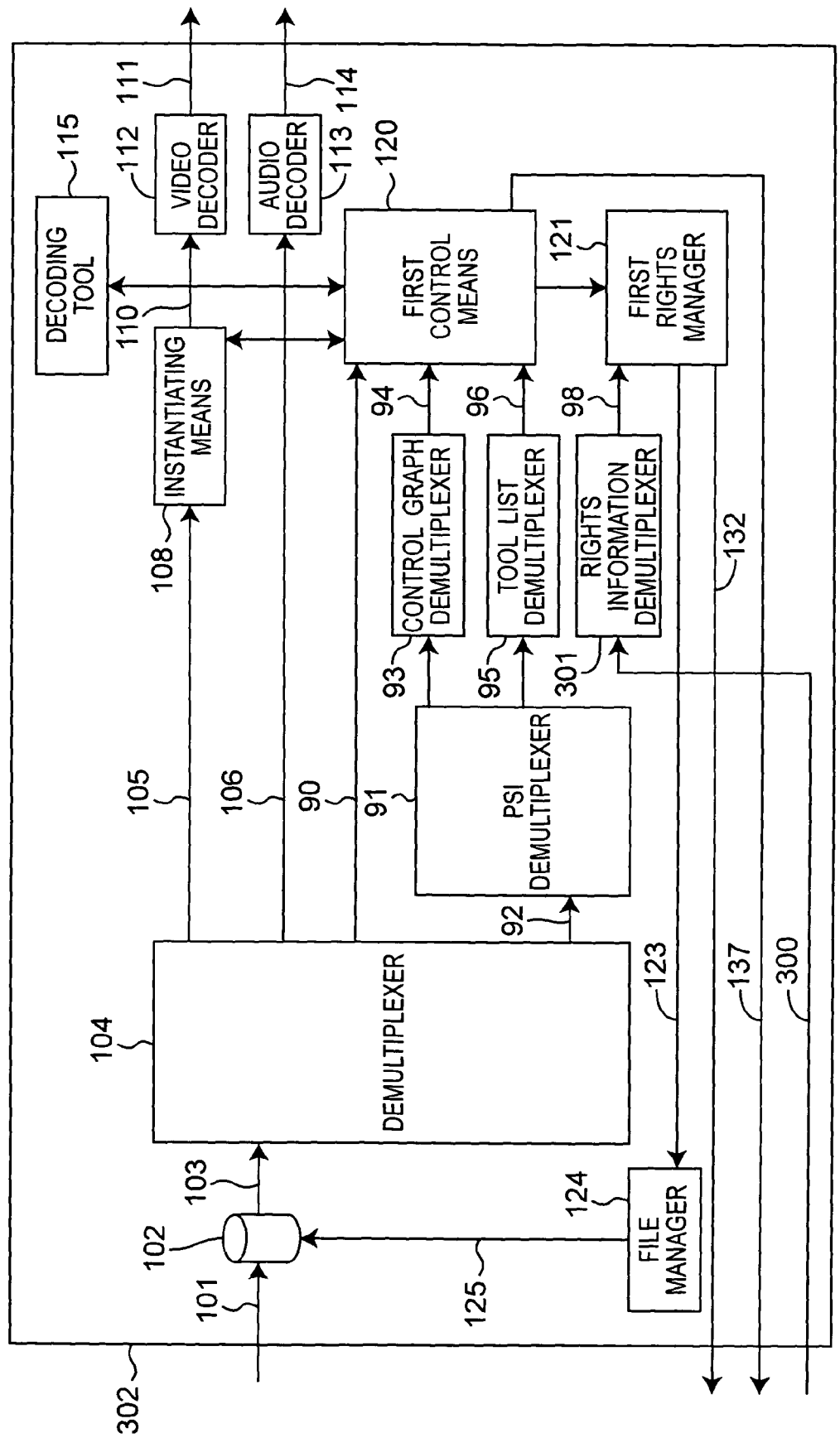
FIG. 11 is a schematic block diagram of a receiving apparatus according to an eighth embodiment of the present invention.

FIG. 11 is a block diagram showing a receiving apparatus according to an eighth embodiment of the present invention.

Referring to FIG. 11, reference numerals 111 to 114 denote the same parts as indicated by the same reference numerals in the prior art example shown in FIG. 15, and reference numerals 90 to 96, 98, 101 to 106, 110, 115, 120, 121, 123 to 125, and 132 denote the same parts referenced thereby in the third embodiment shown in FIG. 4.

Also shown in FIG. 11 are reception rights information 300, rights information receiver 301, and seventh receiving apparatus 302. The seventh receiving apparatus is connected to the transmission apparatus 86 shown in FIG. 3 according to the second embodiment of this invention. This eighth embodiment of the invention is similar to the third embodiment, but differs in that the rights information 98 is acquired from the reception rights information 300 instead of from the program-specific information (PSI) 92.

Referring to FIG. 11, the MPEG-2 Systems-compliant first input multiplexed bitstream 101 is first stored temporarily to the hard disk drive 102, and is then read from storage and applied to the demultiplexer 104 as first multiplexed bitstream 103. The demultiplexer 104 then separates this multiplexed bitstream 103 into the first encrypted video bitstream 105, audio bitstream 106, program-specific information 92, and stream information 90.

The program-specific information 92 describes the relationship between the first encrypted video bitstream 105, audio bitstream 64, and program number of the program, and includes rights information 98 for the program, tool list 96 with the tool ID (0X00A) for AES decoding, and control graph 94 showing that the decoding tool is instantiated between the demultiplexer 104 and video decoder 112 of the receiving apparatus 302. The read information 90 also contains key information for decrypting the first encrypted video bitstream 105.

The read information 90 is isolated by the demultiplexer 104 and applied to the first control means 120. The program-specific information 92 is applied to the PSI demultiplexer 91. The control graph demultiplexer 93 extracts the control graph 94 from the PSI demultiplexer 91, and supplies it to the first control means 120. The tool list demultiplexer 95 extracts the tool list 96 from the PSI demultiplexer 91, and supplies it to the first control means 120. The rights information receiver 301 receives the reception rights information 300, and extracts and outputs the rights information 98 to the first rights manager 121.

The first control means 120 sends first request information 137 as shown in Table 23. As shown in the table, a tool and content (program) request are sent.

TABLE 23

| Tool request | 0X10000000 |
|---|---|
| Content request | 0X01000000 |

The first control means 120 knows from the tool list 96 that decoding tool 115 is the tool needed for decryption, knows from the control graph 94 that the control point for applying the decoding tool 115 is 108, and extracts the descrambling key from the read information (PSI) 90.

The first control means 120 sends a command for instantiating the decoding tool 115 and key information extracted from the stream information 118 to the instantiating means 108 according to the control graph 94, which indicates that the decoding tool 115 is instantiated between the demultiplexer 104 and video decoder 112 of the seventh receiving apparatus 302. The instantiating means 108 then embeds the decoding tool 115 and key information. The first encrypted video bitstream 105 is then decrypted by the instantiating means 108, and output as video bitstream 110.

The video bitstream 110 is then decompressed by the video decoder 112 and output as digital video signal 111. The audio bitstream 106 is expanded by the audio decoder 113, and output as digital audio signal 114.

The first rights manager 121 acquires the rights information 98, and outputs file management information 123 to the file manager 124. Because the playback count assigned with the value shown in Table 4 is only once with program A, the file manager 124 sends a hard disk drive control command 125 to the hard disk drive 102 to erase the stored program A once the program has been read once.

The first rights manager 121 sends the information shown in Table 24 as the first reply information 132. This reply shows that the program has been played once by the seventh receiving apparatus 302.

TABLE 24

| No. times played by 7th receiver | 0X00000001 |
|---|---|

Ninth Embodiment

Figure 12:
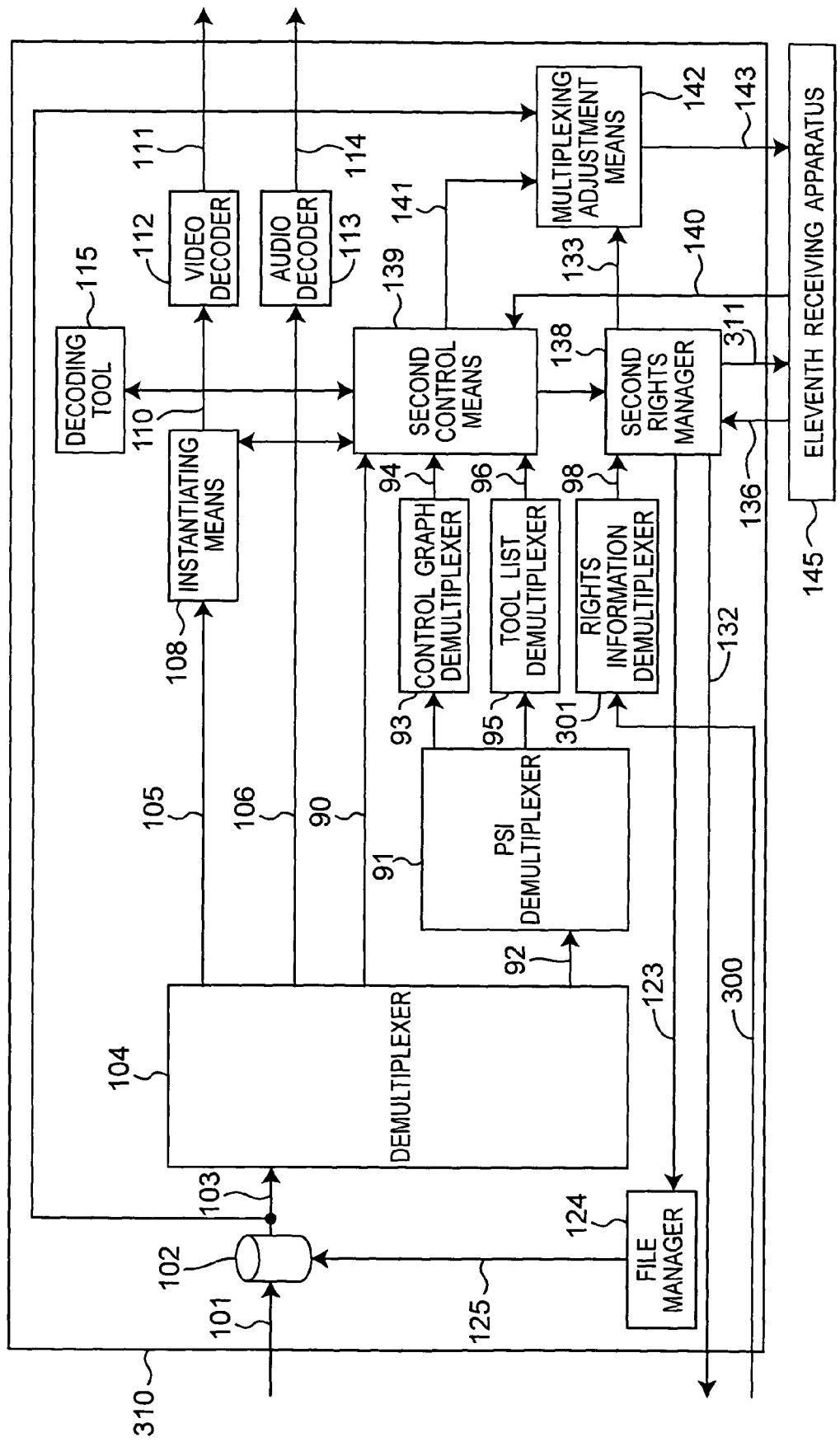
FIG. 12 is a schematic block diagram of a receiving apparatus according to a ninth embodiment of the present invention.

FIG. 12 is a block diagram showing a receiving apparatus according to a ninth embodiment of the present invention. This ninth embodiment of the invention can download received rights information to a receiving apparatus connected to a network, transfer digital data, and send rights consumption information to a server.

Referring to FIG. 12, reference numerals 111 to 114 denote the same parts as indicated by the same reference numerals in the prior art example shown in FIG. 15, reference numerals 90 to 96, 98, 101 to 106, 110, 115, 123 to 125, and 132 denote the same parts referenced thereby in the third embodiment, reference numerals 133, 136, 138 to 143 denote the same parts referenced thereby in the fourth embodiment, and reference numerals 300 and 301 denote the same parts referenced thereby in the eighth embodiment.

Also shown in the figure are an eighth receiving apparatus 310 and eleventh receiving apparatus 145.

This eighth receiving apparatus 310 is assumed to be connected to the second transmission apparatus according to the present invention shown in FIG. 3, and the eleventh receiving apparatus 145 has the same functions as the first receiving apparatus shown in FIG. 4.

Referring to FIG. 12, the control graph demultiplexer 93 extracts the control graph 94 from the PSI demultiplexer 91, and supplies it to the second control means 139. The tool list demultiplexer 95 extracts the tool list 96 from the PSI demultiplexer 91, and supplies it to the second control means 139. The rights information receiver 301 receives the reception rights information 300 and extracts the rights information 98, which it then outputs to the second rights manager 138.

The second control means 139 receives second request information 140 as shown in Table 25 from the eleventh receiving apparatus 145. Table 25 shows that the eleventh receiving apparatus 145 sent tool and content requests to the second receiving apparatus 130.

TABLE 25

| Tool request | 0X10000000 |
|---|---|
| Content request | 0X01000000 |

The read information 90 is demultiplexed by the demultiplexer 104 and applied to the second control means 139. The second rights manager 138 separates the rights information 98 into the first rights information used by the second receiving apparatus 130 and the second rights information 133 used by the eleventh receiving apparatus 145, and based on the first rights information sends file management information 123 to the file manager 124. A rights approval command is sent to the second rights manager 138, and first control information 141 including correction of the first multiplexed bitstream 103 is sent to the multiplexing adjustment means 142.

If the eighth receiving apparatus 310 plays program B with rights information shown in Table 4 once and sends program B to eleventh receiving apparatus 145, the first rights information is as shown in Table 26 and second rights information 133 is as shown in Table 27. Note that the playback count is reduced by one in Table 27 showing the second rights information sent to the eleventh receiving apparatus 145 because program B was played once by second receiving apparatus 130.

TABLE 26

| Copying | prohibited | 0X00000000 |
|---|---|---|
| Playback count | | 1X00000001 |
| Editing | prohibited | 0X00000011 |

TABLE 27

| Copying | prohibited | 0X00000001 |
|---|---|---|
| Playback count | | 1X00000002 |
| Editing | prohibited | 0X00000011 |

The second rights manager 138 sends the second rights information 133 shown in Table 14 to the multiplexing adjustment means 142. The multiplexing adjustment means 142 then modifies the first multiplexed bitstream 103 based on the second rights information 133. That is, the rights information 122 of first multiplexed bitstream 103 is changed to the content of second rights information 133 to output second multiplexed bitstream 143.

Other operations are as described in the fourth embodiment. As a result the second receiving apparatus 130 can send the received rights information, bitstream, and tool information to the eleventh receiving apparatus 145 connected over a network.

The second rights manager 138 outputs first reply information 132 based on the second reply information from the eleventh receiving apparatus 145. If the eighth receiving apparatus 310 and eleventh receiving apparatus 145 each played the stream once, the first reply information is output as shown in Table 28.

TABLE 28

| No. times played by 2nd receiver | 0X00000001 |
|---|---|
| No. times played by 10th receiver | 0X00000001 |

The transmission apparatus according to this embodiment of the invention can thus acquire consumption information from the eighth receiving apparatus 310 and a eleventh receiving apparatus 145 connected to the eighth receiving apparatus 310.

Tenth Embodiment

Figure 13:
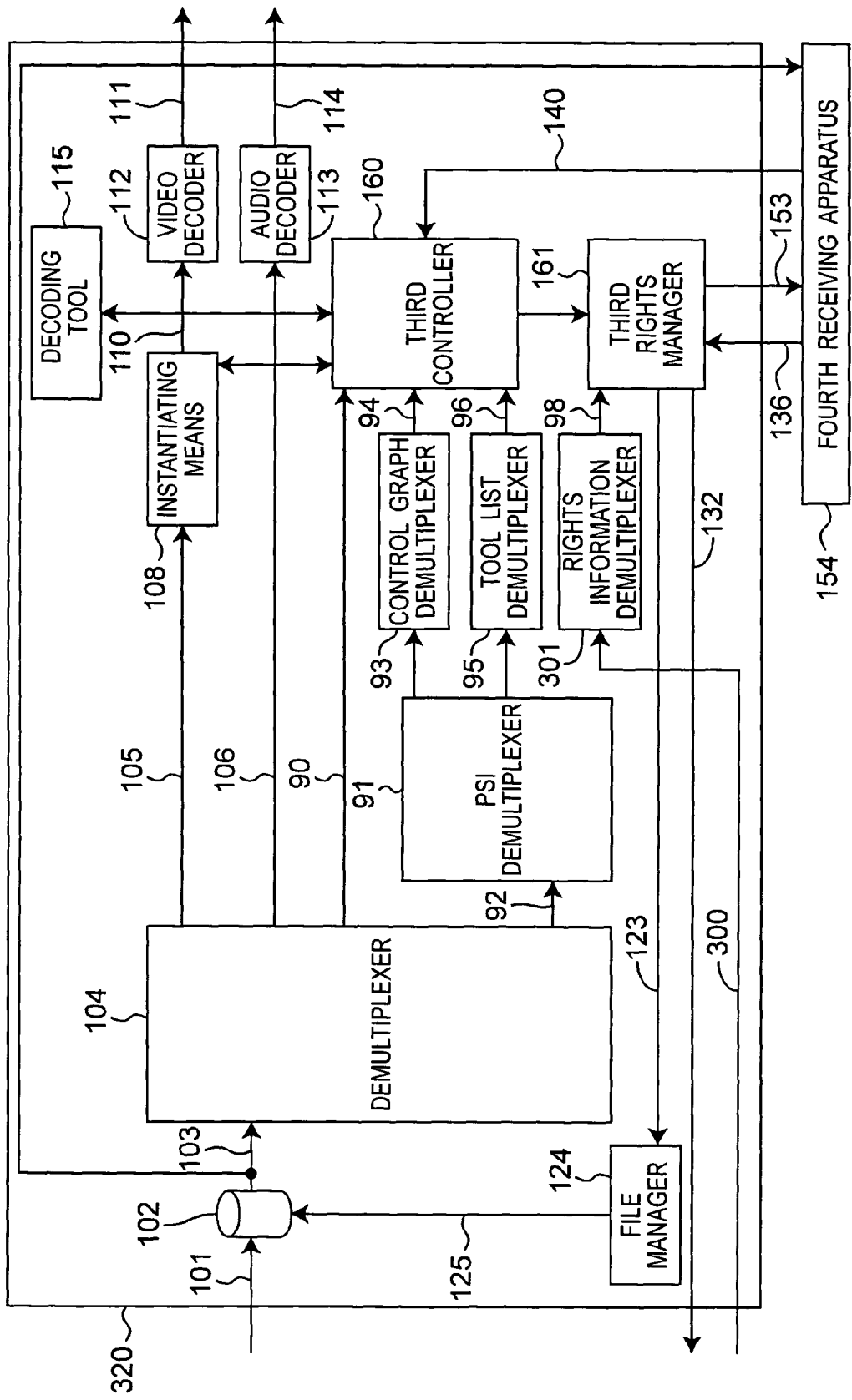
FIG. 13 is a schematic block diagram of a receiving apparatus according to a tenth embodiment of the present invention.

FIG. 13 is a block diagram showing a receiving apparatus according to a tenth embodiment of the present invention. This tenth embodiment of the invention relates to a separate receiving apparatus connected to another receiving apparatus over a home network.

Referring to FIG. 13, reference numerals 111 to 114 denote the same parts as indicated by the same reference numerals in the prior art example shown in FIG. 15, reference numerals 90 to 96, 98, 101 to 106, 110, 115, 123 to 125, and 132 denote the same parts referenced thereby in the third embodiment shown in FIG. 4, reference numerals 136 and 140 are the same as in the fourth embodiment shown in FIG. 5, reference numerals 153, 154, 160, and 161 denote the same parts referenced thereby in the fifth embodiment shown in FIG. 8, and reference numerals 300 and 301 denote the same parts referenced thereby in the eighth embodiment shown in FIG. 11.

Also shown in FIG. 11 is a ninth receiving apparatus 320.

Referring to FIG. 13, the control graph demultiplexer 93 extracts the control graph 94 from the PSI demultiplexer 91, and supplies it to the third controller 160. The tool list demultiplexer 95 extracts the tool list 96 from the PSI demultiplexer 91, and supplies it to the third controller 160. The rights information receiver 301 receives the reception rights information 300, and extracts and outputs the rights information 98 to the third rights manager 161.

The read information 90 is applied to the third controller 160. The third rights manager 161 separates the rights information 98 into the first rights information used by ninth receiving apparatus 320 and third rights information 153 used by fourth receiving apparatus 154, and sends the third rights information 153 to fourth receiving apparatus 154.

The third controller 160 receives the second request information 140 shown in Table 28 from fourth receiving apparatus 154. Table 29 shows that the fourth receiving apparatus 154 sent tool and content requests to the ninth receiving apparatus 320. The third controller 160 sends rights approval information to the third rights manager 161.

TABLE 29

| Tool request | 0X10000000 |
|---|---|
| Content request | 0X01000000 |

If the content was played once by ninth receiving apparatus 320 and once by fourth receiving apparatus 154, the first rights information and third rights information 153 will be as shown in Table 30 and Table 31, respectively. The playback count is decremented one in Table 31 because the content was played once by ninth receiving apparatus 320.

TABLE 30

| Copying | prohibited | 0X00000000 |
|---|---|---|
| Playback count | | 1X00000001 |
| Editing | prohibited | 0X00000011 |

TABLE 31

| Copying | prohibited | 0X00000001 |
|---|---|---|
| Playback count | | 1X00000002 |
| Editing | prohibited | 0X00000011 |

Other operations are the same as described in the fifth embodiment. As a result this ninth receiving apparatus 320 can send the received rights information, bitstream, and tool information to the fourth receiving apparatus 154.

Eleventh Embodiment

Figure 14:
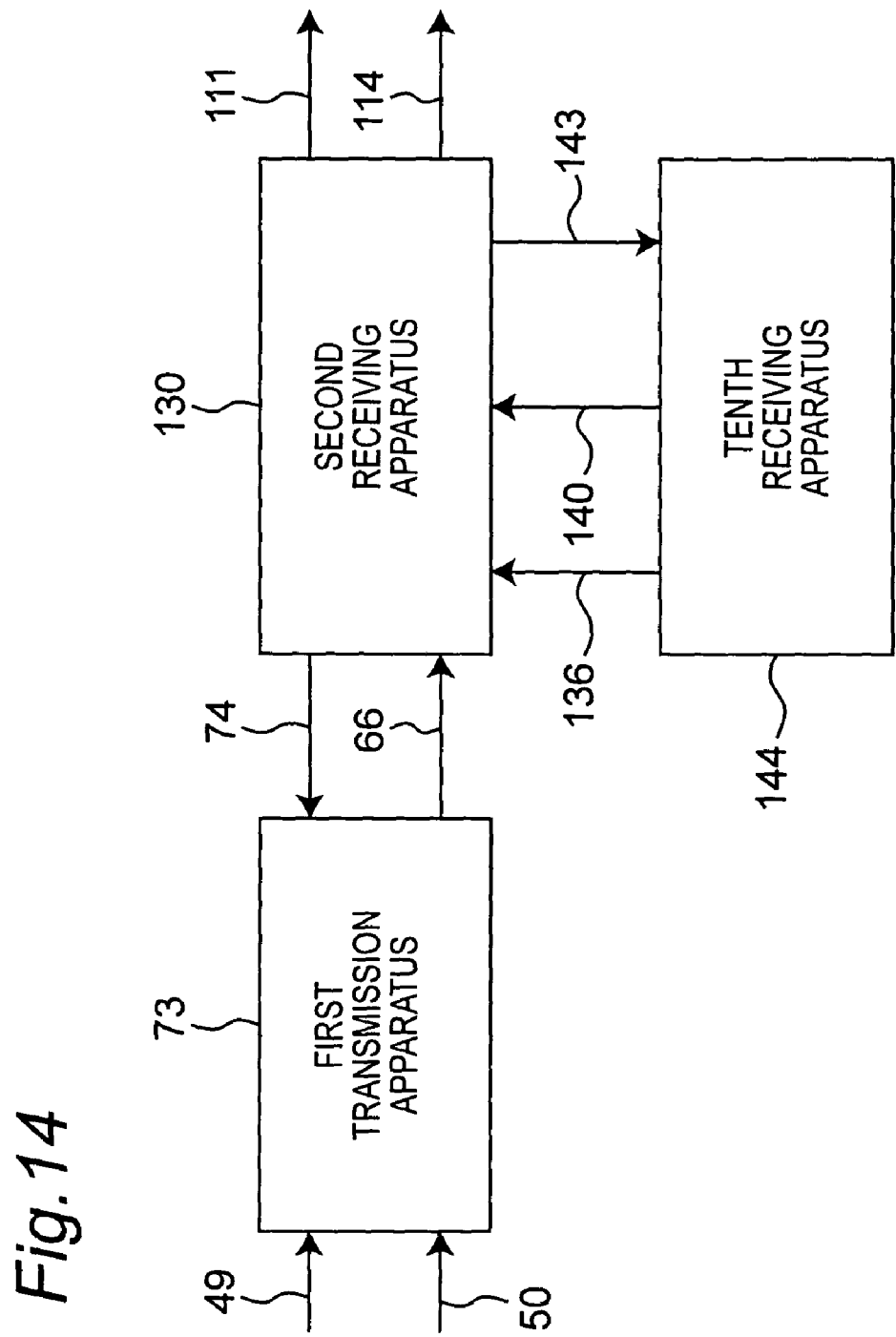
FIG. 14 shows the system configuration of an eleventh embodiment of the present invention.

FIG. 14 is a block diagram showing a receiving apparatus according to an eleventh embodiment of the present invention. This eleventh embodiment of the invention relates to a first transmission apparatus 73, second receiving apparatus 130, and tenth receiving apparatus 144 connected by a network to the second receiving apparatus.

Referring to FIG. 14, reference numerals 49 and 50 denote the same parts as indicated by the same reference numerals in the prior art example shown in FIG. 15, reference numerals 66, 73, and 74 denote the same parts referenced thereby in the first embodiment, and reference numerals 111, 114, 130, 136, 140, 143, and 144 denote the same parts referenced thereby in the fourth embodiment shown in FIG. 5.

Referring to FIG. 14, the tenth receiving apparatus 144 outputs second request information 140 to second receiving apparatus 130.

The second receiving apparatus 130 outputs status information 74 to first transmission apparatus 73.

The first transmission apparatus 73 outputs a first multiplexed bitstream 66 as in the first embodiment above.

The first multiplexed bitstream 66 received by the second receiving apparatus 130 is labelled 101 in the fourth embodiment, is processed the same as in the fourth embodiment to output digital video signal 111 and digital audio signal 114, and is output as second multiplexed bitstream 143 to tenth receiving apparatus 144.

The tenth receiving apparatus 144 operates the same as in the third embodiment of this invention, and outputs second reply information 136.

EFFECTS OF THE INVENTION

As will be obvious from the above descriptions, the present invention can download encrypted data, a tool list and tool for decrypting the encrypted data, the location where the tool is instantiated, key information, and rights information to a receiving apparatus as part of the multiplexed data. Our invention can therefore provide a highly reliable transmission apparatus that can always provide the latest protection for digital content.

This invention also provides the advantage of being able to process the encrypted data, a tool list and tool for decrypting the encrypted data, the location where the tool is instantiated, key information, and rights information as part of the program-specific information of the multiplexed data.

This invention can also send the rights information as a file separate from the multiplexed data. Because the rights information can thus be handled separately from the multiplexed data, a convenient transmission apparatus that does not need to remultiplex the content stream when the receiving apparatus rewrites the rights information for transfer to another receiving apparatus can be provided.

This invention can also send the rights information as a file separate from the multiplexed data while also specifically correlating the rights information to the multiplexed data. A convenient transmission apparatus that can correctly associate multiple multiplexed data streams with the corresponding rights information can therefore be provided.

Yet further, this invention can also provide a convenient transmission apparatus that can multiplex and send the decoding tool for decrypting the encrypted content stream together with the content stream.

Yet further, this invention can also provide a convenient transmission apparatus that can multiplex and send key information for decrypting the encrypted content stream together with the content stream.

The present invention can also provide a high reliability receiving apparatus that can download and therefore update encrypted data, a tool list and tool for decrypting the encrypted data, the location where the tool is instantiated, key information, and rights information as part of the multiplexed data. As a result, the receiving apparatus of our invention can always provide the latest protection for digital content.

Furthermore, because the present invention can download encrypted data, a tool list and tool for decrypting the encrypted data, the location where the tool is instantiated, key information, and rights information, this information can be updated and the latest protection for digital content can always be provided. Even more conveniently, this information can be processed as part of the program-specific information of the multiplexed data.

Furthermore, because the present invention can download encrypted data, a tool list and tool for decrypting the encrypted data, the location where the tool is instantiated, key information, and rights information, this information can be updated and the latest protection for digital content can always be provided. In addition, because the rights information can be sent as a separate file from the multiplexed data, a receiving apparatus with the convenience of being able to handle rights information separately from the multiplexed data, and the option of sending the rights information to another receiving apparatus, can be provided.

Furthermore, because the present invention can download encrypted data, a tool list and tool for decrypting the encrypted data, the location where the tool is instantiated, key information, and rights information, this information can be updated and the latest protection for digital content can always be provided. In addition, because received encrypted data can be deleted based on the rights information, a high reliability receiving apparatus that does not leave used content on the receiving apparatus and can prevent unauthorized use can be provided.

Furthermore, because the present invention can download encrypted data, a tool list and tool for decrypting the encrypted data, the location where the tool is instantiated, key information, and rights information, this information can be updated and the latest protection for digital content can always be provided. In addition, the receiving apparatus can send consumption information about received encrypted data to the transmission apparatus, and can provide information about content consumption by the receiving apparatus.

Furthermore, because the present invention can download to a different receiving apparatus encrypted data, a tool list and tool for decrypting the encrypted data, the location where the tool is instantiated, key information, and rights information, this information can be updated and the latest protection for digital content can always be provided. In addition, the receiving apparatus can send to the transmission apparatus consumption information about encrypted data received by a different receiving apparatus, and can provide information about content consumption by the receiving apparatus.

Furthermore, because the present invention can download encrypted data, a tool list and tool for decrypting the encrypted data, the location where the tool is instantiated, key information, and rights information, this information can be updated and the latest protection for digital content can always be provided. In addition, the received rights information can be separated and sent with the encrypted data to another receiving apparatus. As a result, the other receiving apparatus can also process the encrypted data with the same high reliability.

Furthermore, because the present invention can download encrypted data, a tool list and tool for decrypting the encrypted data, the location where the tool is instantiated, key information, and rights information, this information can be updated and the latest protection for digital content can always be provided. In addition, by converting the received data, the receiving apparatus can transfer it as a signal optimized for another receiving apparatus.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The present disclosure relates to subject matter contained in priority Japanese Patent Application No. 2002-210727, filed on Jul. 19, 2002, the contents of which is herein expressly incorporated by reference in its entirety.

What is claimed is:

1. A receiving apparatus, comprising:
   a demultiplexer that separates a multiplexed signal containing first encrypted data into at least the first encrypted data and program-specific information;
   a tool list demultiplexor that separates a tool list having a tool identification indicating a decoding tool for decrypting the first encrypted data from the multiplexed signal;
   a control graph demultiplexor that separates a control graph indicating an instantiated location of the decoding tool in the receiving apparatus from the multiplexed signal;
   a rights information demultiplexor that demultiplexes rights information for the first encrypted data from the multiplexed signal, the rights information specifying at least one of rights for a permitted number of accesses and rights for editing in the receiving apparatus;
   a first controller that acquires a tool according to the tool identification acquired from the tool list, and instantiating the tool according to the control graph;
   a first rights manager that processes the first encrypted data according to the rights information;
   a second rights manager that separates the rights information into first rights information and second rights information; and
   a multiplexing adjustor that modifies the rights information in the multiplexed signal, and that outputs a revised multiplexed signal,
   wherein the revised multiplexed signal is output to a second receiving apparatus in accordance with a request signal from the second receiving apparatus.

2. The receiving apparatus according to claim 1, further comprising:
   a temporary storage that temporarily stores the first encrypted data; and
   a file manager that deletes from the temporary storage the first encrypted data after a playback permit recorded in the rights information is expired.

3. The receiving apparatus according to claim 1,
   wherein the rights manager sends status information denoting a processing state of the first encrypted data.

4. The receiving apparatus according to claim 1, further comprising:
   a rights manager that separates the rights information into first rights information and second rights information;
   wherein the second rights information and multiplexed signal are output to a second receiving apparatus according to a request signal from the second receiving apparatus.

5. The receiving apparatus according to claim 1,
   wherein the rights manager receives data indicating how the first encrypted data was processed by a second receiving apparatus, and sends status information describing processing by the receiving apparatus and the second receiving apparatus.

6. The receiving apparatus according to claim 1, further comprising:
   a converter that converts the first encrypted data to second encrypted data; and a remultiplexer that remultiplexes the second encrypted data with second rights information.

7. The receiving apparatus according to claim 1, wherein the first encrypted data is processed according to the first rights information.

8. The receiving apparatus according to claim 1, further comprising:
    a temporary storage that temporarily stores the first encrypted data; and
    a file manager that deletes the first encrypted data from the temporary storage after sending it to a second receiving apparatus.

9. The receiving apparatus according to claim 1, further comprising:
    a video decoder that extracts and decodes video data from the multiplexed signal.

10. The receiving apparatus according to claim 1, further comprising:
    an audio decoder that extracts and decodes audio data from the multiplexed signal.

11. The receiving apparatus according to claim 3, wherein the processing state in the receiving apparatus comprises the permitted number of accesses, editing allowed information and editing prohibited information.

12. The receiving apparatus according to claim 5, wherein a processing state in the second receiving apparatus comprises the permitted number of accesses, editing allowed information and editing prohibited information.

* * * * *